US009070906B2

(12) United States Patent
Syuto et al.

(10) Patent No.: US 9,070,906 B2
(45) Date of Patent: Jun. 30, 2015

(54) BATTERY ASSEMBLING APPARATUS AND BATTERY ASSEMBLY MANUFACTURING METHOD

(75) Inventors: Kazutoshi Syuto, Okazaki (JP); Tsuyoshi Yano, Toyota (JP); Koji Tamaru, Toyota (JP); Yuta Nemoto, Toyota (JP); Shogo Shibai, Toyota (JP); Hirokuni Sasaki, Nagoya (JP); Shigeki Ishii, Toyota (JP)

(73) Assignee: Toyota Jidosha Kabushiki Kaisha, Toyota-shi, Aichi-ken ( * ) Notice: Subject to any disclaimer, the term of this patent is extended or adjusted under 35 U.S.C. 154(b) by 0 days.

(21) Appl. No.: 13/498,718

(22) PCT Filed: May 26, 2011

(86) PCT No.: PCT/JP2011/062115
§ 371 (c)(1),
(2), (4) Date: Mar. 28, 2012

(87) PCT Pub. No.: WO2012/160696
PCT Pub. Date: Nov. 29, 2012

(65) Prior Publication Data
US 2014/0096374 A1   Apr. 10, 2014

(51) Int. Cl.
*H01M 2/00* (2006.01)
*H01M 2/10* (2006.01)
*H01M 10/04* (2006.01)

(52) U.S. Cl.
CPC ............ *H01M 2/00* (2013.01); *Y10T 29/53135* (2015.01); *Y10T 29/49108* (2015.01); *H01M 2/1077* (2013.01); *H01M 10/0404* (2013.01); *H01M 2220/20* (2013.01)

(58) Field of Classification Search
CPC .......... H01M 2/0232; H01M 10/0404; H01M 10/058; H01M 10/0585; H01M 10/14; H01M 10/16; H01M 4/08; H01M 2/00; H01M 2/1077; G03B 17/04; Y10T 29/49108
USPC .......................... 29/730, 731, 623.1; 429/158
See application file for complete search history.

(56) References Cited

U.S. PATENT DOCUMENTS

| 2,609,945 | A  | * | 9/1952  | Doughty ........................ 221/261 |
| 7,060,116 | B2 | * | 6/2006  | Marukawa et al. ........... 29/623.1 |
| 2010/0255360 | A1 | * | 10/2010 | Umemoto et al. ............ 429/120 |

FOREIGN PATENT DOCUMENTS

| JP | 6-59176   | 3/1994 |
| JP | 9-306274  | 11/1997 |

(Continued)

OTHER PUBLICATIONS

English Translation of Foreign Docunment JP 2001-334419 A: Hasaka et al., Assembly Device.*

*Primary Examiner* — Milton I Cano
*Assistant Examiner* — Philip A Stuckey
(74) *Attorney, Agent, or Firm* — Finnegan, Henderson, Farabow, Garrett & Dunner, LLP

(57) ABSTRACT

A battery assembling apparatus is disclosed. The battery assembling apparatus comprises: first and second rotary tables arranged to face each other at points on respective outer circumferences and rotate in forward directions relative to each other; a battery holding part provided on the outer circumference of the first rotary table to hold a battery; a frame holding part provided on the outer circumference of the second rotary table to hold a frame; a battery supplying part for supplying batteries to the battery holding part at a position different from a facing position between the first and second rotary tables; a frame supplying part for supplying frames to the frame holding part at a position different from the facing position; and a discharging part for taking out an assembly of a battery and a frame assembled together from the facing position.

4 Claims, 16 Drawing Sheets

(56) References Cited

FOREIGN PATENT DOCUMENTS

| JP | 2000-147717 | 5/2000 |
| JP | 2000-247506 | 9/2000 |
| JP | 2001334419 A * | 12/2001 | ............. B23P 19/00 |
| JP | 2007-115437 | 5/2007 |
| JP | 2010-165597 | 7/2010 |

* cited by examiner

BATTERY ASSEMBLING APPARATUS AND BATTERY ASSEMBLY MANUFACTURING METHOD

CROSS-REFERENCE TO RELATED APPLICATIONS

This application is a national phase application of International Application No. PCT/JP2011/062115, filed May 26, 2011, the contents of which are incorporated herein by reference.

TECHNICAL FIELD

The present invention relates to a battery assembling apparatus and a battery assembly manufacturing method. More particularly, it relates to a battery assembling apparatus and a battery assembly manufacturing method for assembling a battery and a frame for accommodating the battery.

BACKGROUND ART

Batteries are used in a wide variety of fields, e.g., as the power source of electronic equipment such as mobile phones or notebook PCs, or of vehicles such as hybrid cars or electric cars. Batteries include nickel cadmium batteries, nickel metal hydride batteries, and lithium ion secondary batteries.

In applications as the power source for various purposes, it is common to use batteries as a battery module assembled by electrically connecting a plurality of cells to obtain a power output in accordance with the purposes of use. For example, a plurality of cells is electrically connected in series to provide a necessary output voltage in a battery module used as the power source of a vehicle. In this case, from a viewpoint of saving installation space in the vehicle, it is common to use a battery module having a plurality of rectangular cells arranged side by side. Heat radiation, as well as electrical and thermal insulation between adjacent cells need to be taken into consideration for a battery module having such a cell arrangement.

Patent Document 1 is one example relating to such a technique. Patent Document 1 discloses a battery module in which a plurality of rectangular cells is arranged side by side with spacers interposed between adjacent cells, the spacers being made of an insulating resin containing a foaming agent that reacts to heat above a certain temperature and is thermally decomposed. Thus, while insulating adjacent cells from each other, the spacers allegedly suppress heat conduction between adjacent cells in the event of an abnormal temperature rise in one of the cells of the battery module. Patent Document 1 also discloses that passages for heat exchange medium are formed in the spacers. This allegedly enables efficient temperature adjustment of the battery module.

RELATED ART DOCUMENTS

Patent Documents

Patent Document 1: JP 2010-165597A

DISCLOSURE OF THE INVENTION

Problems to be Solved by the Invention

Generally, battery modules mounted in vehicles are subjected to vibration and impact. Thus, a frame configuration covering the cell, instead of the spacer configuration disclosed in Patent Document 1, is assumed to prevent displacement and rattling between the cells and the frames.

However, a frame having functions such as heat radiation, and electrical and thermal insulation would have a complex shape. To prevent displacement and rattling between the cells and the frames, the space between them needs to be small. This will require a high assembling accuracy when assembling the cells and the frames. A robot could hold each of a cell and a frame and assemble them, because robots are capable of performing precise and complex movements.

In the meantime, the number of cells necessary for one vehicle has increased in recent years to as high as several hundreds. Therefore the process of assembling cells and frames is required to be performed at high speed. However, a robot can assemble only one pair of cell and frame at one time. Moreover, frames made of resin are prone to deform and cannot be firmly held by the robot. Thus the operating speed of the robot would be limited. Accordingly, a robotic assembly system would have a low productivity due to the difficulty in increasing the speed.

An object of the present invention is therefore to provide a battery assembling apparatus and a battery assembly manufacturing method, with which cells and frames for accommodating the cells can be accurately assembled with high productivity.

Means of Solving the Problems

To achieve the above object, one aspect of the invention provides a battery assembling apparatus for assembling a battery and a frame for accommodating this battery, comprising: a first rotary table and a second rotary table arranged to face each other at points on respective outer circumferences and rotate in forward directions relative to each other; a battery holding part provided on the outer circumference of the first rotary table and configured to hold a battery; a frame holding part provided on the outer circumference of the second rotary table and configured to hold a frame; a battery supplying part for supplying batteries to the battery holding part at a position different from a facing position between the first and second rotary tables; a frame supplying part for supplying frames to the frame holding part at a position different from the facing position; and a discharging part for taking out an assembly of a battery and a frame assembled together from the facing position, wherein the first and second rotary tables are configured to be rotated with a rotation speed ratio and in a phase relationship such that the battery holding part and the frame holding part face each other every time at the facing position.

The battery assembling apparatus according to the present invention has a first rotary table and a second rotary table rotating in forward directions relative to each other such that the battery holding part and the frame holding part face each other every time at the facing position. Batteries and frames are respectively supplied to the battery holding part and the frame holding part at positions different from the facing position. The assembled battery and frame can be taken out sequentially by the discharging part. Thus the operations of feeding, assembling, and discharging the batteries and the frames can be performed continuously at high speed.

In the battery assembling apparatus described above, preferably, a circumferential speed of the first rotary table is faster than that of the second rotary table. Thereby, the battery and the frame can be assembled without obstructing each other even when the frame has little dimensional allowance for the cell to be accommodated therein. In other words, the battery and the frame can be assembled with high accuracy. Moreover, the number of product defects due to damage to the battery and the frame can be reduced. In addition, the number of facility shutdown due to a battery and a frame dropping off of the respective holding parts can be reduced.

In the battery assembling apparatus described above, preferably, the battery holding part includes: a first holding claw fixedly provided for holding a front-side end of the battery in an advancing direction of rotation of the first rotary table; a second holding claw movably provided for holding a rear-side end of the battery in the advancing direction of rotation of the first rotary table; a biasing member biasing the second holding claw to move closer to the first holding claw; and a restricting portion defining a range of movement of the second holding claw by the bias of the biasing member.

In the battery assembling apparatus described above, preferably, the frame holding part includes: a first holding claw fixedly provided for holding a rear-side end of the frame in an advancing direction of rotation of the second rotary table; a second holding claw movably provided for holding a front-side end of the frame in the advancing direction of rotation of the second rotary table; a biasing member biasing the second holding claw to move closer to the first holding claw; and a restricting portion defining a range of movement of the second holding claw by the bias of the biasing member.

If the circumferential speed of the first rotary table is faster than that of the second rotary table, there is a risk that the battery and the frame after being assembled may be obstructed by the second holding claw of the battery holding part and the second holding claw of the frame holding part. This is because of the difference in rotating speed of the battery holding part and the frame holding part. Therefore, by providing a mechanism for accommodating the obstruction due to the difference in the rotating speed to one or both of the second holding claw of the battery holding part and the second holding claw of the frame holding part, the number of product defects due to damage to the battery and the frame can be reduced.

The battery assembling apparatus described above preferably further includes a movable part for pressing at least one of the battery held by the battery holding part and the frame held by the frame holding part toward the other within a facing region that contains the facing position, wherein at least one of the first rotary table and the second rotary table is formed with a pressing action profile for causing the movable part to be in a non-pressing state when the battery holding part and the frame holding part are outside the facing region and for causing the movable part to perform the pressing action when the battery holding part and the frame holding part are within the facing region. If the frame has a large depth, it is difficult to assemble the battery deep into the frame by merely rotating the battery and the frame. Specifically, there would remain a gap between the battery and the frame. Therefore, by providing the movable part that presses the battery into the frame by the amount of such a gap, they can be assembled without obstructing each other. Since the movable part operates by the rotation of the first and second rotary tables, it does not need to have an independent drive power source.

In the battery assembling apparatus described above, preferably, the first and second rotary tables are installed horizontally, and the frame holding part is configured to hold the frame in an inclined orientation such that a lower end of the frame protrudes radially outward from the second rotary table more than an upper end. By thus inclining the frame, the battery and the frame can be assembled by the weight of the battery. Also, even when the frame has little dimensional allowance for the battery, the battery and the frame are less affected by their positional precision when the battery is fitted into the frame. This is because the battery can be inserted into the frame in an inclined state. Therefore, strict control is not necessary in terms of rotation axes parallelism of the rotary tables and positions of the battery and the frame in respect of the directions in which the gravity acts. Accordingly the assembling apparatus can be made less expensive.

In the battery assembling apparatus described above, preferably, the battery holding part and the frame holding part are respectively provided such as to be swingable within rotation planes of the first and second rotary tables around a pivot axis on a front side in the advancing direction of the rotation of the first or second rotary table, wherein the apparatus comprises: a battery holding part biasing member that biases the battery holding part at a position on a rear side relative to the pivot axis in the advancing direction of the rotation of the first rotary table radially outward from the first rotary table; a battery holding part restricting portion that defines a limit of movement of the battery holding part by the bias of the battery holding part biasing member; a frame holding part biasing member that biases the frame holding part at a position on the rear side relative to the pivot axis in the advancing direction of the rotation of the second rotary table radially outward from the second rotary table; and a frame holding part restricting portion that defines a limit of movement of the frame holding part by the bias of the frame holding part biasing member. In this way, the battery holding part and the frame holding part can rotate while maintaining parallelism between the battery and the frame. In other words, the battery and the frame relatively approach each other while being maintained in parallel with each other. The battery and the frame can thus be assembled.

A battery assembly manufacturing method according to another aspect of the present invention is a method of manufacturing battery assemblies by assembling batteries and frames for accommodating the batteries, the method comprising: rotating a first rotary table and a second rotary table in forward directions relative to each other such that points on respective outer circumferences face each other, holding a battery with a battery holding part provided on the outer circumference of the first rotary table at a position different from a facing position between the first and second rotary tables, holding a frame with a frame holding part provided on the outer circumference of the second rotary table at a position different from the facing position, and rotating the first and second rotary tables with a rotation speed ratio and in a phase relationship such that the battery holding part and the frame holding part face each other every time at the facing position.

Effects of the Invention

According to the invention, a battery assembling apparatus and a battery assembly manufacturing method, with which batteries and frames for accommodating the batteries can be accurately assembled with high productivity.

MODE FOR CARRYING OUT THE INVENTION

A preferred embodiment of embodying the present invention will be described in detail below with reference to the drawings. In this embodiment, the present invention is embodied in association with a lithium ion secondary battery.

First Embodiment

Overall Schematic Configuration

Figure 1:
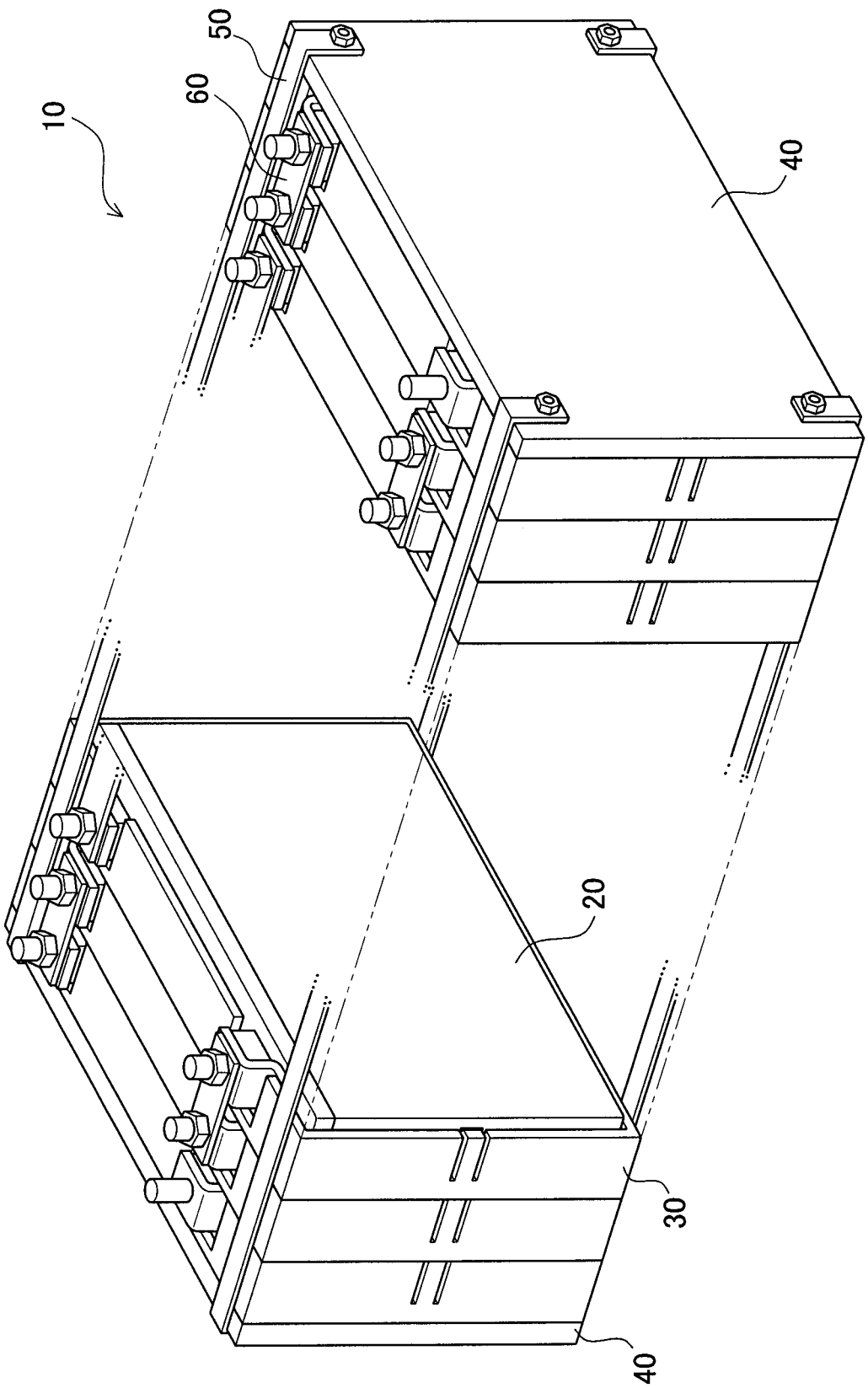
FIG. 1 is a view to explain a battery module according to the present invention.
Figure 2:
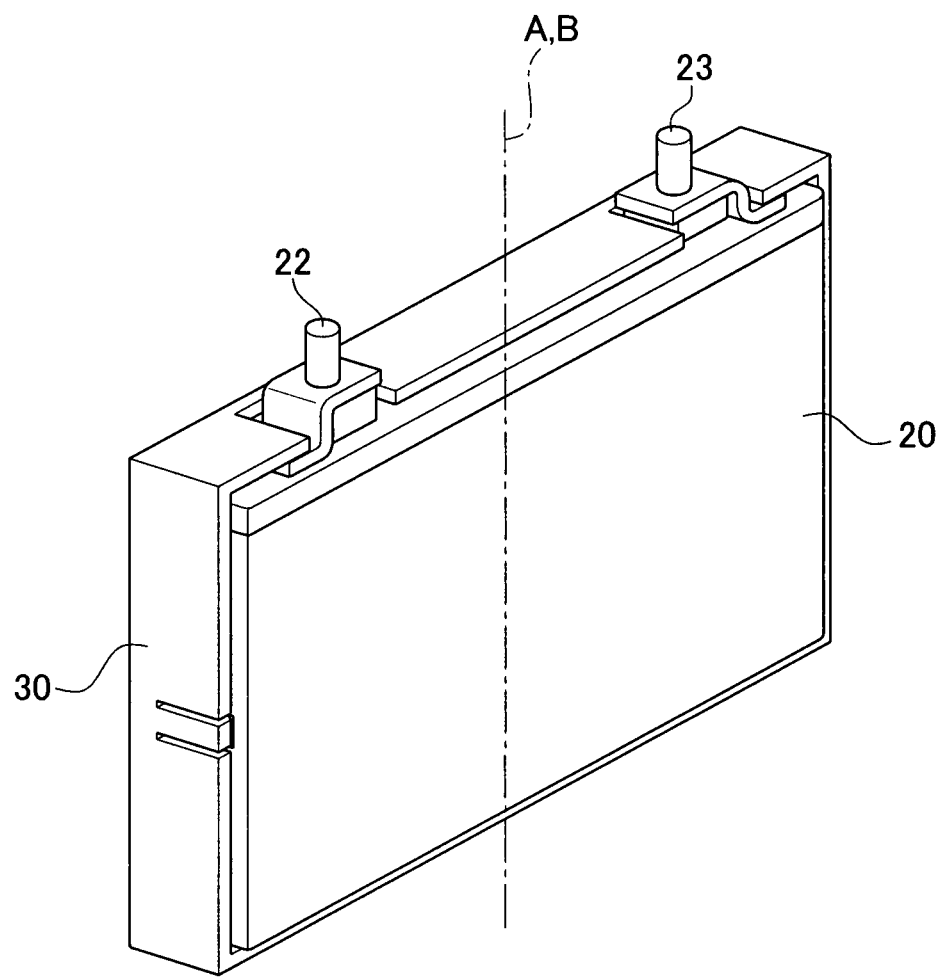
FIG. 2 is a view of a cell and a frame assembled together according to the invention.

FIG. 1 shows a battery module 10 according to this embodiment. The battery module 10 is a set of batteries, which consists of a plurality of batteries 20. The batteries 20 are each accommodated in respective frames 30 as shown in FIG. 2. The battery module 10 is formed by aligning battery assemblies, in each of which a battery 20 and a frame 30 are assembled together, side by side along one direction and fastened with a metal band 50, with end plates 40 flanking the assemblies at either end. The plurality of batteries 20 in the battery module 10 is electrically connected in series by bus bars 60.

Figure 3:
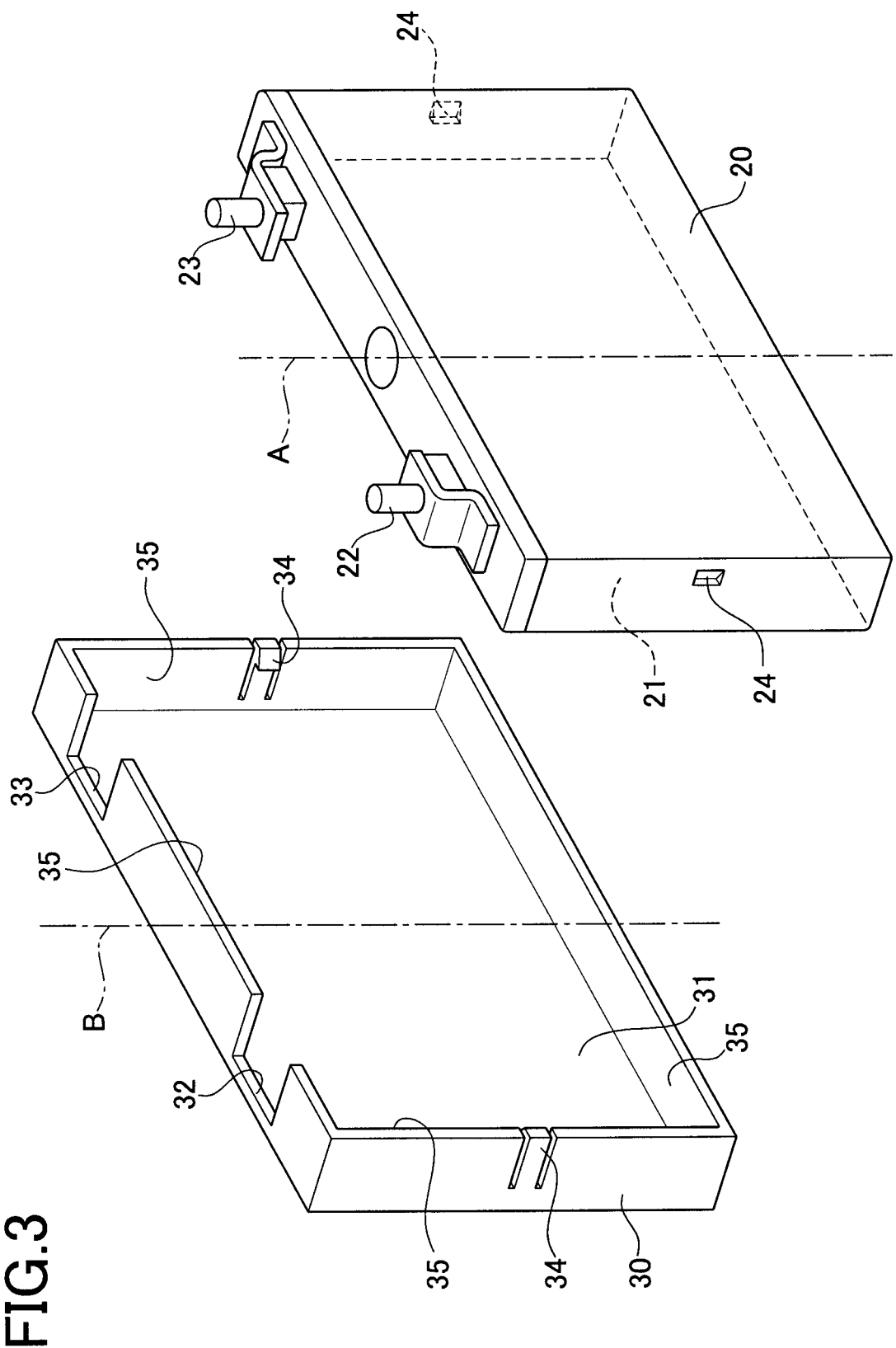
FIG. 3 is a view of a cell and a frame before being assembled together according to the invention.

FIG. 3 shows a battery 20 and a frame 30 prior to assembly. The battery 20 is a lithium ion secondary battery with a rectangular parallelepiped outer shape. The battery 20 accommodates inside a power generating element formed by winding a positive electrode plate and a negative electrode plate with separators interposed therebetween into a flat shape, and liquid electrolyte composed of an organic solvent containing lithium salt dissolved therein.

An outer surface of the battery 20 that first enters the frame 30 when being assembled thereto will be referred to as an insertion surface 21. The battery 20 includes a positive electrode terminal 22 and a negative electrode terminal 23. The positive electrode terminal 22 and the negative electrode terminal 23 are provided for establishing electrical connection with other batteries 20 via bus bars 60. The positive electrode terminal 22 is connected to the positive electrode plate inside the battery 20. The negative electrode terminal 23 is connected to the negative electrode plate inside the battery 20. The battery 20 further includes to-be-locked portions 24 to be locked to the frame 30.

In this context, the outer surface of the battery 20 is mostly made of metal. This is why all the batteries 20 of the battery module 10 are assembled with frames 30 made of an insulating resin to provide insulation between the respective outer surfaces of adjacent batteries 20. The frame 30 has very little dimensional allowance for the battery 20 in the battery assembly. This is for preventing displacement and rattling when the battery module 10 is subjected to vibration or impact. The frame 30 may further has a thermal insulation function to prevent heat conduction between adjacent batteries 20 when the battery 20 accommodated therein generates heat abnormally. In addition, the frame 30 may be formed with a passage for heat exchanging medium to move in order to radiate heat generated by the battery 20 accommodated therein.

The frame 30 has a base section 31 and wall sections 35 provided along the four sides of the base section 31, and generally forms a flat parallelepiped shape. The opposite of the base section 31 is open. Thus the frame 30 can accommodate a battery 20 inside. As a battery assembly, the base section 31 of the frame 30 makes tight contact with the insertion surface 21 of the battery 20. The wall sections 35 are formed with cut-outs 32 and 33 at corresponding positions so as to allow the positive electrode terminal 22 and the negative electrode terminal 23 of the battery 20 to protrude out of the frame 30. The wall sections 35 further include locking portions 34 to engage with the to-be-locked portions 24 of the battery 20.

In FIG. 3, the center line A passing through the center of the surface including the electrode terminals of the battery 20 is an imaginary line perpendicular to this surface. The center line B is an imaginary line indicating the center line A of the battery 20 in a battery assembly with respect to the frame 30. Thus, the center line A of the battery 20 and the center line B of the frame 30 coincide with each other in the battery assembly as shown in FIG. 2. The battery 20 and the frame 30 in FIG. 2 are assembled by locking engagement between the to-be-locked portions 24 and the locking portions 34. Accordingly, once assembled, the battery 20 and the frame 30 cannot easily be separated.

Assembling Apparatus

Figure 4:
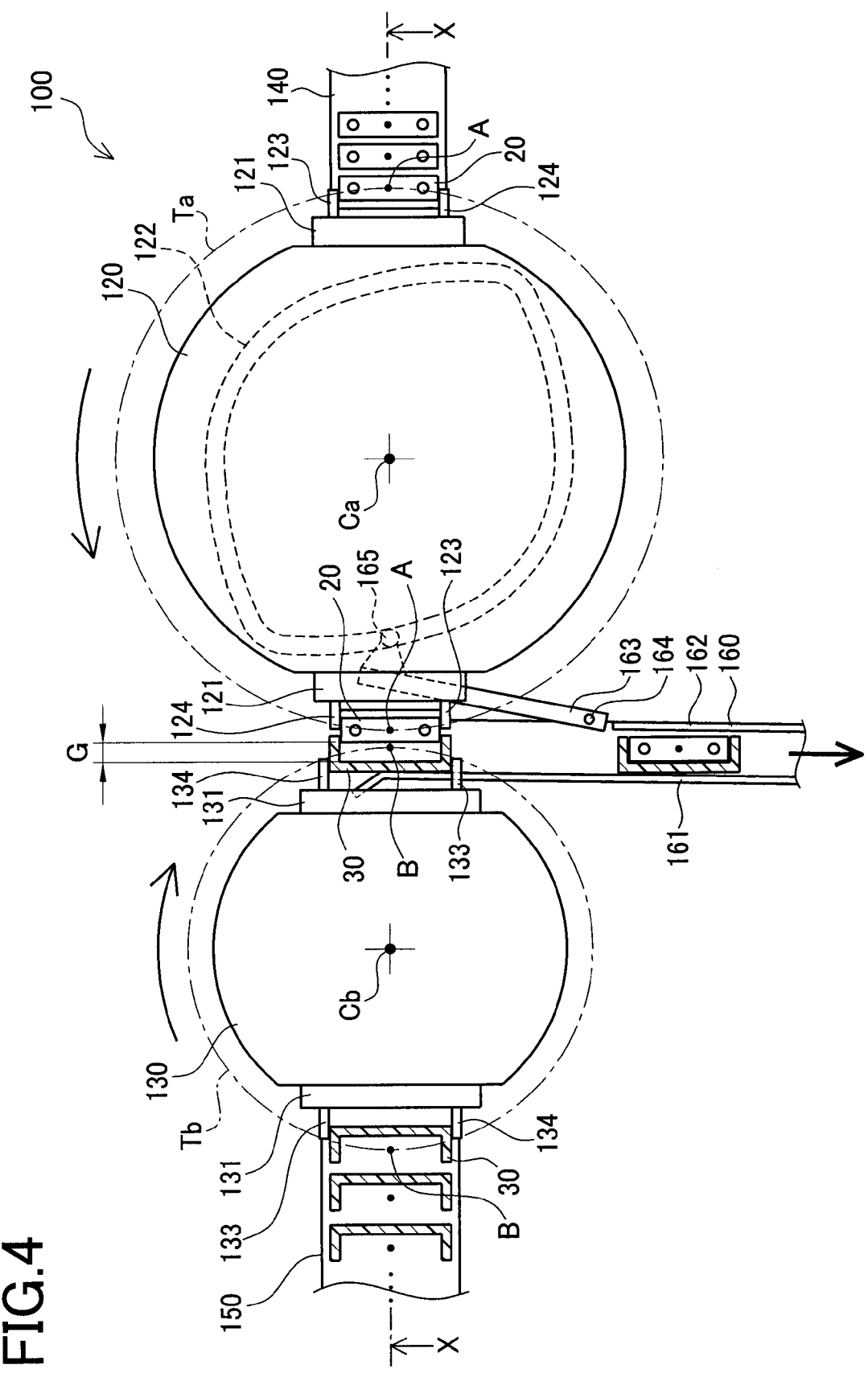
FIG. 4 is a plan view of an assembling apparatus of a first embodiment.
Figure 5:
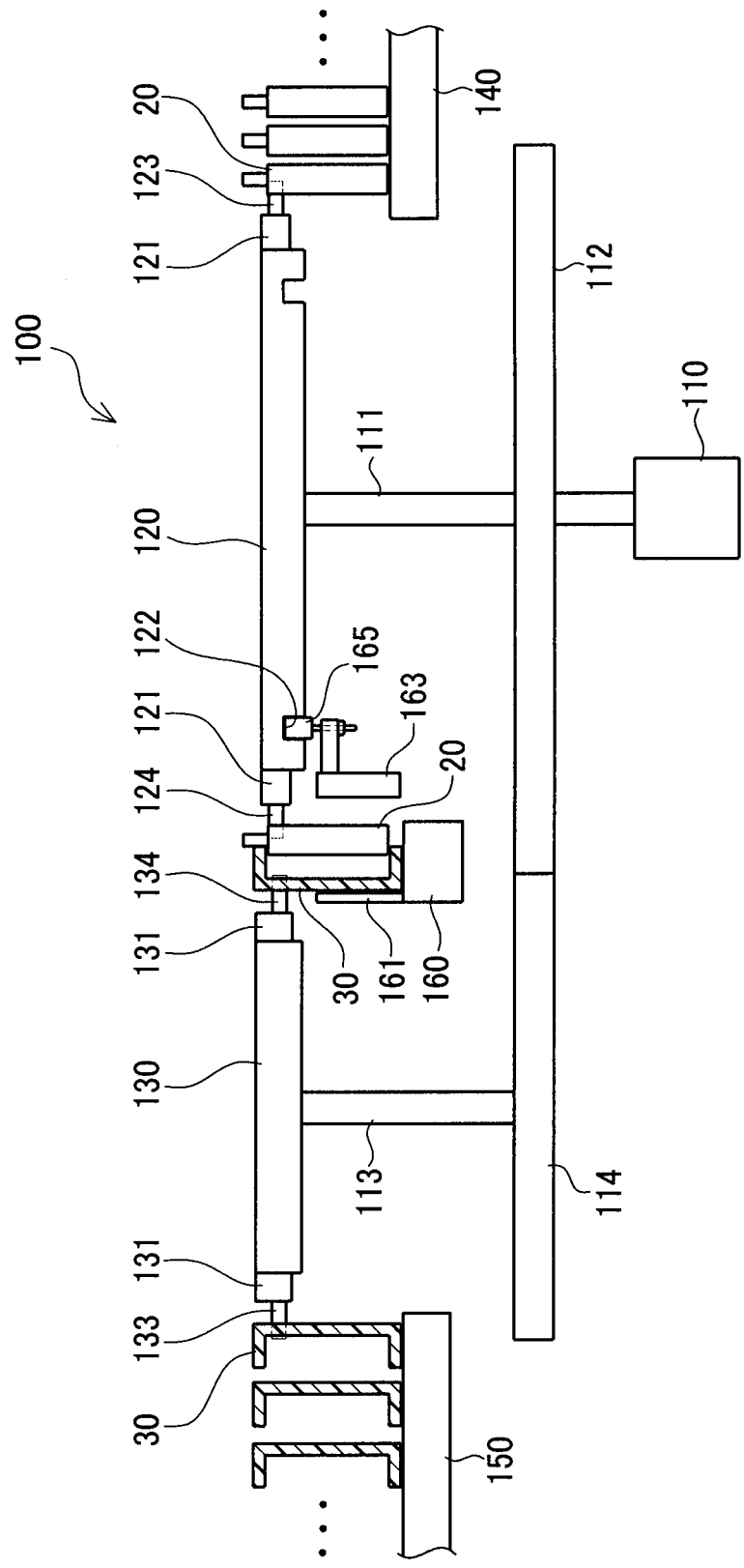
FIG. 5 is a cross section of the assembling apparatus of the first embodiment in a facing position (a cross section taken along a line X-X in FIG. 4)
Figure 14:
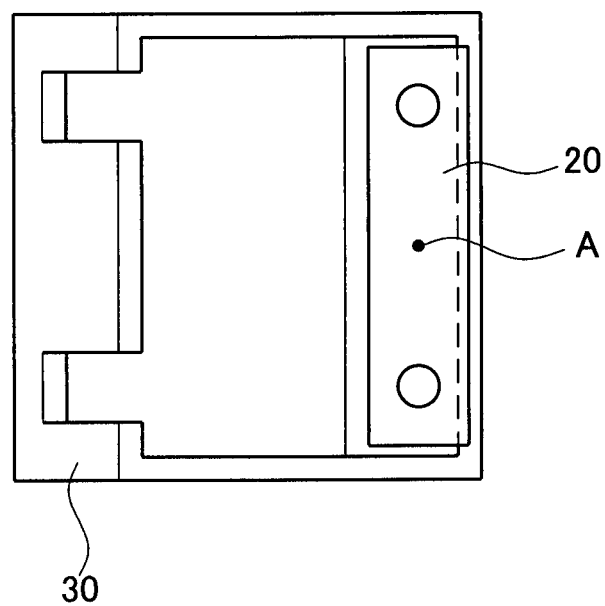
FIG. 14 is a plan view of a cell and a frame in the facing position in the third embodiment.

FIG. 4 is a plan view of the assembling apparatus 100 that assembles the battery 20 and the frame 30 in this embodiment. In FIG. 4, gravity acts in a direction toward the far side of the paper plane. FIG. 5 is a cross section along X-X of FIG. 4. The assembling apparatus 100 includes a rotary table 120, a rotary table 130, a battery supplying magazine 140, a frame supplying magazine 150, and a conveyor 160. In FIG. 4, the center line A of the battery 20 and the center line B of the frame 30 are perpendicular to the paper plane. Therefore, in FIG. 4, the center line A is shown as a center point A, while the center line B is shown as a center point B. Further, in FIG. 5, the batteries 20 have their surface including the positive electrode terminal 22 and the negative electrode terminal 23 oriented upwards. The frames 30 have their surface formed with the cut-outs 32 and 33 oriented upwards. In this context, the frame 30 has a shape shown in FIG. 3. However, in the drawings from FIG. 4 onwards (except for FIG. 14), the frames 30 are illustrated as a square U-shape which is a cross section thereof, for straightforward representation of the frames 30.

The rotary table 120 is coupled to a driving power source 110 by a drive shaft 111 as shown in FIG. 5. The rotary table 120 is thus driven to rotate by the driving power source 110. The rotary table 120 can rotate counterclockwise around the point Ca in FIG. 4 as the center. A drive gear 112 is secured to the drive shaft 111 as shown in FIG. 5.

The rotary table 130 is coupled to a driven gear 114 by a driven shaft 113 as shown in FIG. 5. The driven gear 114 meshes with the drive gear 112. Thus the rotary table 130 can rotate clockwise around the point Cb in FIG. 4 as the center. Specifically, the rotary table 120 and the rotary table 130 are driven to rotate by the driving power source 110 in forward directions relative to each other.

The rotary table 120 and the rotary table 130 face each other at one outer circumferential point as shown in FIG. 4. The position where the rotary table 120 and the rotary table 130 face each other will be referred to as facing position. Also, regions including the facing position and downstream of the facing position in respective rotating directions of the rotary table 120 and the rotary table 130 will be referred to as facing regions.

The rotary table 120 includes two battery holding jigs 121 for holding a battery 20 on the outer circumference thereof as shown in FIG. 4. The two battery holding jigs 121 are located oppositely to each other with the point Ca being the center therebetween. Each of the battery holding jig 121 includes claws 123 and 124 for holding a battery 20. The battery holding jig 121 is configured to hold an upper part of the battery 20 as shown in FIG. 5. The one-dot chain line Ta in FIG. 4 represents the trajectory Ta the center point A of the battery 20 held by the battery holding jig 121 draws with the rotation of the rotary table 120. The battery holding jig 121 holds the battery 20 such that the insertion surface 21 is parallel to a tangent line of the trajectory Ta at the center point A.

In this context, a cam groove 122 is formed in the lower surface of the rotary table 120, as shown in FIG. 4 and FIG. 5. The cam groove 122 is provided for causing a movable guide 163 to perform a pressing action which will be described later when the battery holding jig 121 is within the facing region.

The rotary table 130 includes two frame holding jigs 131 for holding a frame 30 on the outer circumference thereof as shown in FIG. 4. The two frame holding jigs 131 are located oppositely to each other with the point Cb being the center therebetween. Each of the frame holding jigs 131 includes claws 133 and 134 for holding a frame 30. The frame holding jig 131 is configured to hold an upper part of the frame 30 as shown in FIG. 5. The one-dot chain line Tb in FIG. 4 represents the trajectory Tb the center point B of the frame 30 held by the frame holding jig 131 draws with the rotation of the rotary table 130. The frame holding jig 131 holds the frame 30 such that the base section 31 is parallel to a tangent line of the trajectory Tb at the center point B.

In this context, the ratio between the angular velocities of the rotary tables 120 and 130 is the ratio of reciprocals of the numbers of holding jigs the tables each have. Specifically, since the numbers of the battery holding jigs 121 and frame holding jigs 131 are the same in this embodiment, the rotary tables 120 and 130 rotate at the same angular velocity.

In this embodiment, the trajectory Ta has a larger diameter than the trajectory Tb as shown in FIG. 4. The speed at which certain points on the respective outer circumferences of the rotary tables 120 and 130 move when they rotate will be referred to as circumferential speed. Thus, the circumferential speed of the rotary table 120 is faster than that of the rotary table 130. This in turn means that the rotating speed of the battery holding jig 121 and the battery 20 located on the outer circumference of the rotary table 120 is faster than that of the frame holding jig 131 and the frame 30 located on the outer circumference of the rotary table 130. The rotary tables 120 and 130 rotate with their phases matched with each other so that the battery holding jig 121 and the frame holding jig 131 face each other every time at the facing position.

The battery supplying magazine 140 is provided for supplying batteries 20 to the rotary table 120. A plurality of batteries 20 is aligned in a row in the battery supplying magazine 140. The respective insertion surfaces 21 of the batteries 20 are facing radially outward from the trajectory Ta. In this context, the position opposite to the facing position with the point Ca being the center therebetween is set as the feeding position of the batteries 20. Thus, the insertion surfaces 21 of the batteries 20 aligned in the battery supplying magazine 140 are parallel to a tangent line of the trajectory Ta at the feeding position of the batteries 20. The battery supplying magazine 140 feeds a battery 20 nearest to the rotary table 120 (frontmost battery 20) to a battery holding jig 121 that has reached the feeding position of the batteries 20 by the rotation of the rotary table 120.

The frame supplying magazine 150 is provided for supplying frames 30 to the rotary table 130. A plurality of frames 30 is aligned in a row in the frame supplying magazine 150. The respective base sections 31 of the frames 30 are facing radially outward from the trajectory Tb. In this context, the position opposite to the facing position with the point Cb being the center therebetween is set as the feeding position of the frames 30. Thus, the base sections 31 of the frames 30 aligned in the frame supplying magazine 150 are parallel to a tangent line of the trajectory Tb at the feeding position of the frames 30. The frame supplying magazine 150 feeds a frame 30 nearest to the rotary table 130 (frontmost frame 30) to a frame holding jig 131 that has reached the feeding position of the frames 30 by the rotation of the rotary table 130.

The conveyor 160 is provided for transferring the batteries 20 and the frames 30 after they have been assembled (i.e., battery assemblies) downward in FIG. 4 from the facing position. The conveyor 160 includes fixed guides 161 and 162 fixed in position, and a movable guide 163 being movable, for guiding the battery assemblies. The fixed guide 161 is arranged on the side of the rotary table 130 of the conveyor 160. The fixed guide 162 and the movable guide 163 are arranged on the side of the rotary table 120 of the conveyor 160. The fixed guide 161 and the movable guide 163 have a height set such that they do not obstruct the rotary tables 120 and 130 as shown in FIG. 5. The fixed guide 162 has the same height as that of the fixed guide 161 and the movable guide 163.

The movable guide 163 has a pivot point 164 and a cam follower 165 as shown in FIG. 4. The cam follower 165 is inserted in the cam groove 122 of the rotary table 120 as shown in FIG. 5. Thus, with the cam follower 165 moving in conformity to the cam groove 122, the movable guide 163 performs the pressing action, around the pivot point 164 as the fulcrum, during the period in which the battery holding jig 121 is within the facing region.

Next, the assembling of the battery 20 and the frame 30 by the assembling apparatus 100 will be described. In FIG. 4, one of the battery holding jigs 121 on the rotary table 120 is located at the feeding position of the batteries 20. At this position, the battery holding jig 121 holds a frontmost one of the batteries 20 arranged in the battery supplying magazine 140. The battery 20 thus held rotates counterclockwise thereafter such that its center point A draws the trajectory Ta.

The other one of the battery holding jigs 121 on the rotary table 120 is located at the facing position. The battery holding jig 121 at the facing position is the one that has held the frontmost battery 20 at the feeding position of the batteries 20 and rotated 180° counterclockwise.

One of the frame holding jigs 131 on the rotary table 130 is located at the feeding position of the frames 30. At this position, the frame holding jig 131 holds a frontmost one of the frames 30 arranged in the frame supplying magazine 150. The frame 30 thus held rotates clockwise thereafter such that its center point B draws the trajectory Tb.

The other one of the frame holding jigs 131 on the rotary table 130 is located at the facing position. The frame holding jig 131 at the facing position is the one that has held the frontmost frame 30 at the feeding position of the frames 30 and rotated 180° clockwise. The battery 20 and the frame 30 are facing each other at the facing position.

However, as shown in FIG. 4, the battery 20 and the frame 30 at the facing position are not completely assembled yet. A completely assembled state of the battery 20 and the frame 30 refers to a state in which the insertion surface 21 makes tight contact with the base section 31, and the to-be-locked portions 24 engage with the locking portions 34. The battery 20 and the frame 30 at the facing position are located directly opposite to each other with their insertion surface 21 and base section 31 parallel to each other. However, there is a gap G between the insertion surface 21 and the base section 31. This is because the frame 30 has a depth that does not allow the battery 20 to reach the inside of the frame 30 by merely rotating the battery 20 and the frame 30. Thus, the trajectories Ta and Tb are separate from each other by the gap G. The battery 20 and the frame 30 are released from their respective holding jigs at the facing position and then transferred downward in FIG. 4 by the conveyor 160.

Figure 6:
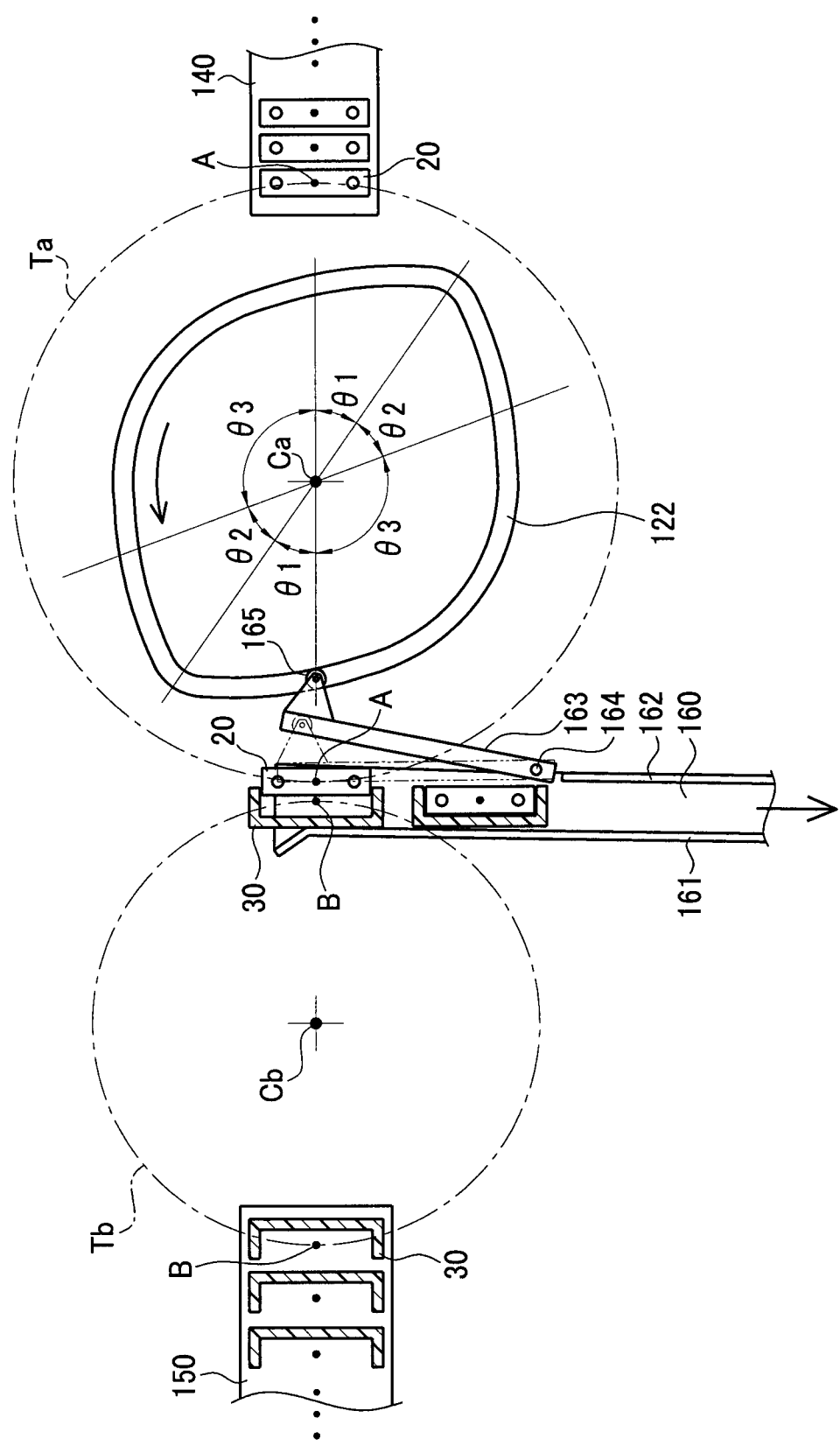
FIG. 6 is a diagram for explaining movement of a movable guide of the assembling apparatus of the first embodiment.

FIG. 6 is a diagram for explaining the movement of the movable guide 163. FIG. 6 shows the cam groove 122 and the movable guide 163 when the battery holding jig 121 and the frame holding jig 131 are located at the facing position as with FIG. 4. The movable guide 163 at this time is positioned farthest from the fixed guide 161.

As shown in FIG. 6, the cam groove 122 is a groove having substantially the same width as the outer diameter of the cam follower 165, the groove being connected into an annular shape. The cam groove 122 has different shapes in zones θ1, θ2, and θ3. The sum of angles of the zones θ1, θ2, and θ3 is 180°. The same shape appears every 180° on the cam groove 122. The cam groove 122 has a circular arc shape in the zone θ3. Specifically, in the zone θ3, the distance between the cam groove 122 and the point Ca is constant. On the other hand, in the zones θ1 and θ2, the cam groove 122 has a shape extending radially outwards from the rotary table 120 more than the zone θ3. The cam groove 122 is farthest from the point Ca at the boundary between the zones θ1 and θ2.

The cam groove 122 rotates with the rotary table 120. The cam follower 165 on the movable guide 163 is inserted in the cam groove 122. Thus the movable guide 163 swings around the pivot point 164 as the fulcrum, with the cam follower 165 moving along the cam groove 122 as it rotates.

More particularly, at a time point before the battery holding jig 121 reaches the facing position, the cam follower 165 is within the zone θ3 of the cam groove 122. Therefore the movable guide 163 is located farthest from the fixed guide 161. Specifically, the zone θ3 of the cam groove 122 sets the movable guide 163 to a non-pressing state. This is a normal state of the movable guide 163. During a period in which the battery holding jig 121 is outside the facing region, the movable guide 163 is in the normal state.

At a time point when the battery holding jig 121 is within the facing region after reaching the facing position, the cam follower 165 is within the zone θ1 of the cam groove 122. Therefore the movable guide 163 performs the pressing action to press the battery 20 toward the fixed guide 161. Thereby, the battery 20 and the frame 30 are held between the fixed guide 161 and the movable guide 163. After the battery holding jig 121 reached the facing position, at a time point when it has rotated through the facing region, the cam follower 165 is located at the boundary between the zones θ1 and θ2 of the cam groove 122. Thus the movable guide 163 performs its pressing action until the battery 20 comes to a position where the assembling of the battery 20 and the frame 30 is complete. At a time point after the battery holding jig 121 has passed the facing region, the cam follower 165 is within the zone θ2 of the cam groove 122. Thus the movable guide 163 returns to its normal state.

Figure 7:
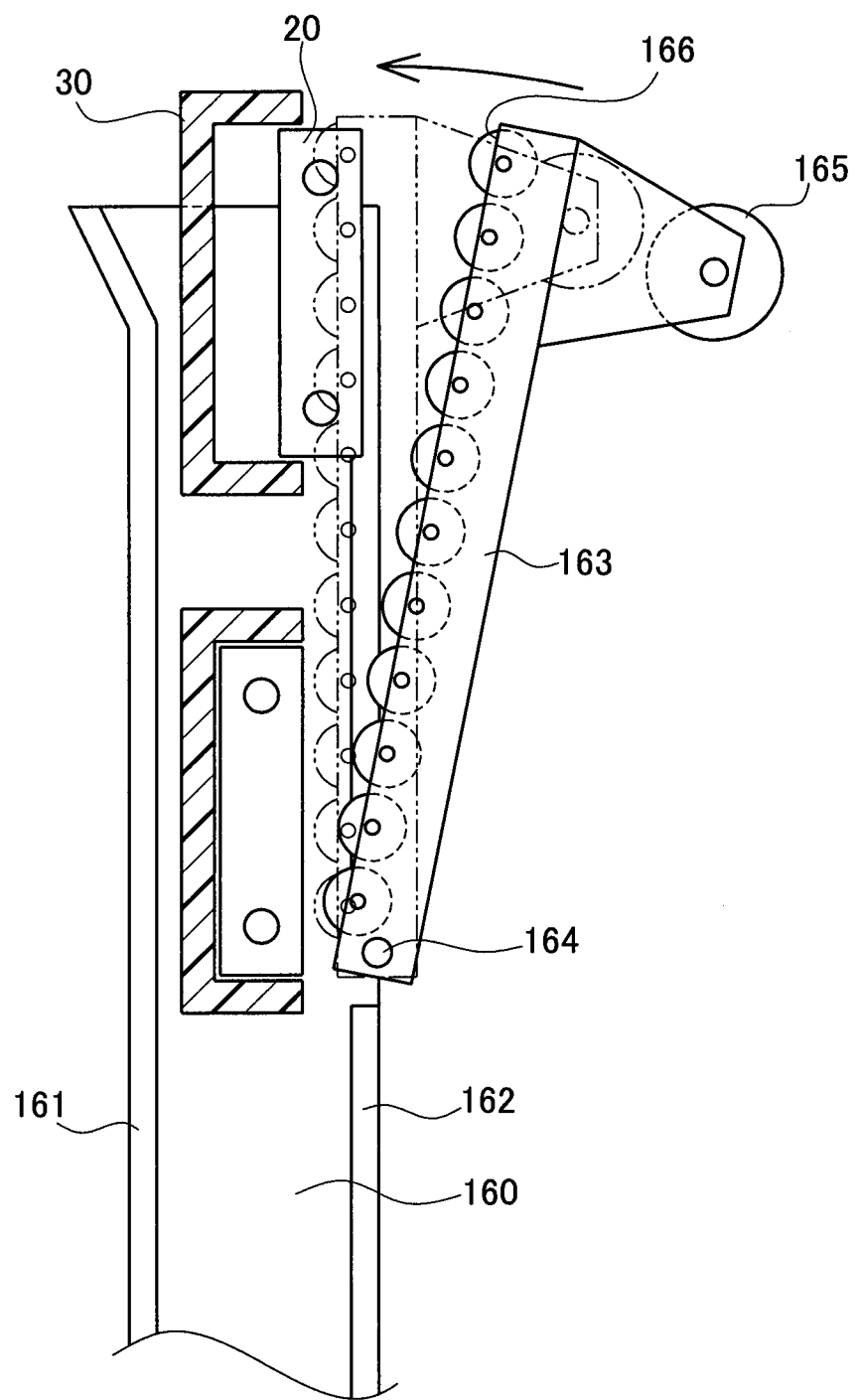
FIG. 7 is a diagram for explaining another movable guide of the assembling apparatus of the first embodiment.

In this context, as shown in FIG. 7, the movable guide 163 may include a plurality of rollers 166 on the surface for pressing the battery 20. This is because damage to the battery 20 can thereby be reduced when the movable guide 163 performs the pressing action.

At the facing position, the battery 20 and the frame 30 are released from their respective holding jigs and transferred downward in FIG. 6 by the conveyor 160. The speed of the conveyor 160 transferring the battery 20 and the frame 30 is set such that the battery 20 and the frame 30 do not reach the boundary between the fixed guide 162 and the movable guide 163 during the pressing action of the movable guide 163. Accordingly, the assembling of the battery 20 and the frame 30 is completed by the pressing action of the movable guide 163 as they are transferred by the conveyor 160.

When one of the battery holding jigs 121 is located at the facing position, the other battery holding jig 121 is located at the feeding position of batteries 20, holding a frontmost battery 20. When one of the frame holding jigs 131 is located at the facing position, the other frame holding jig 131 is located at the feeding position of frames 30, holding a frontmost frame 30. Thus, as the rotary tables 120 and 130 continue to rotate, the next battery 20 and frame 30 will be assembled. By thus continuously rotating, the rotary tables 120 and 130 can continuously assemble the batteries 20 and frames 30.

Figure 8:
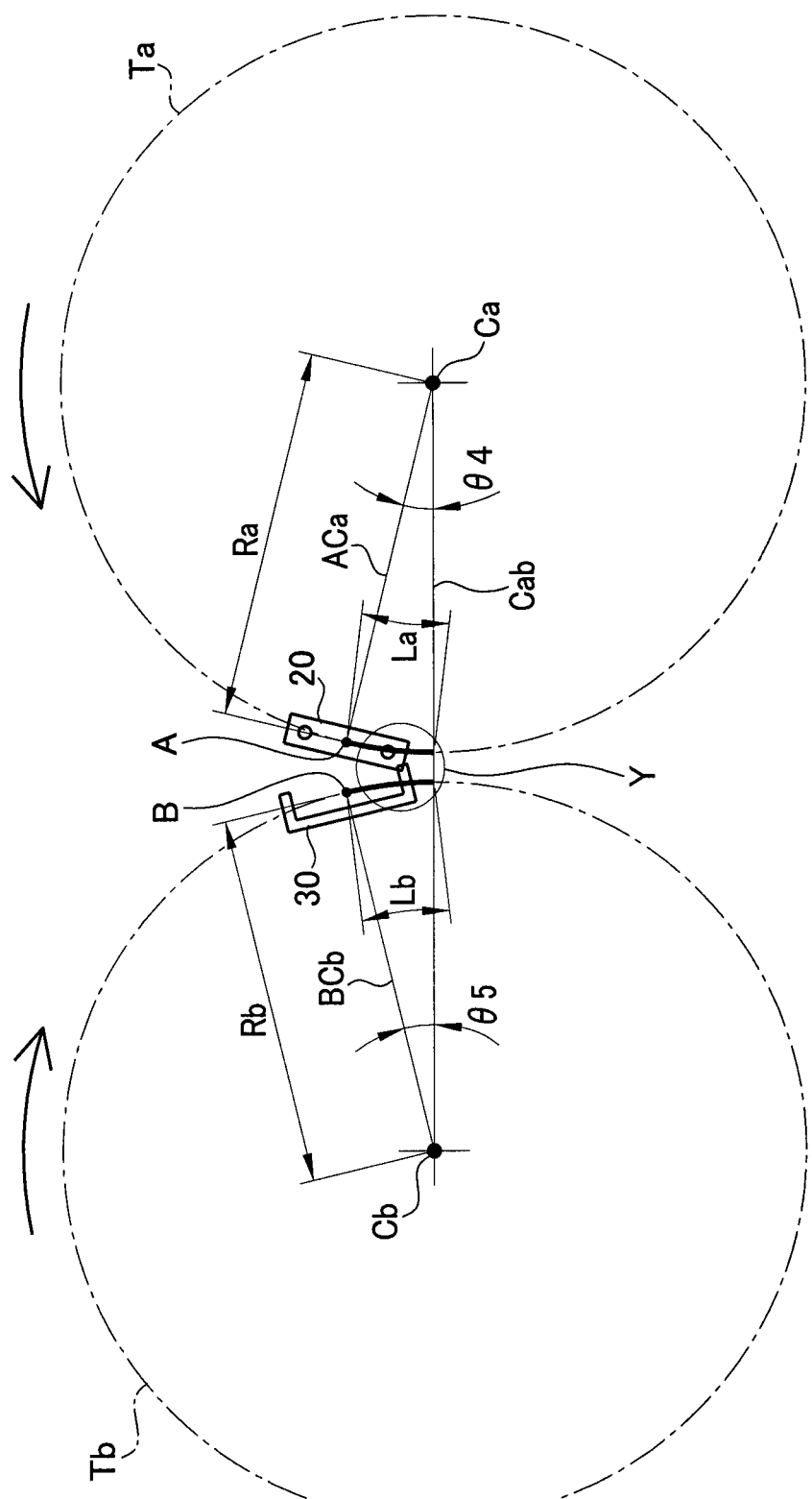
FIG. 8 is a diagram showing a case where a trajectory drawn by a cell being rotated and a trajectory drawn by a frame being rotated have the same diameter.
Figure 9:
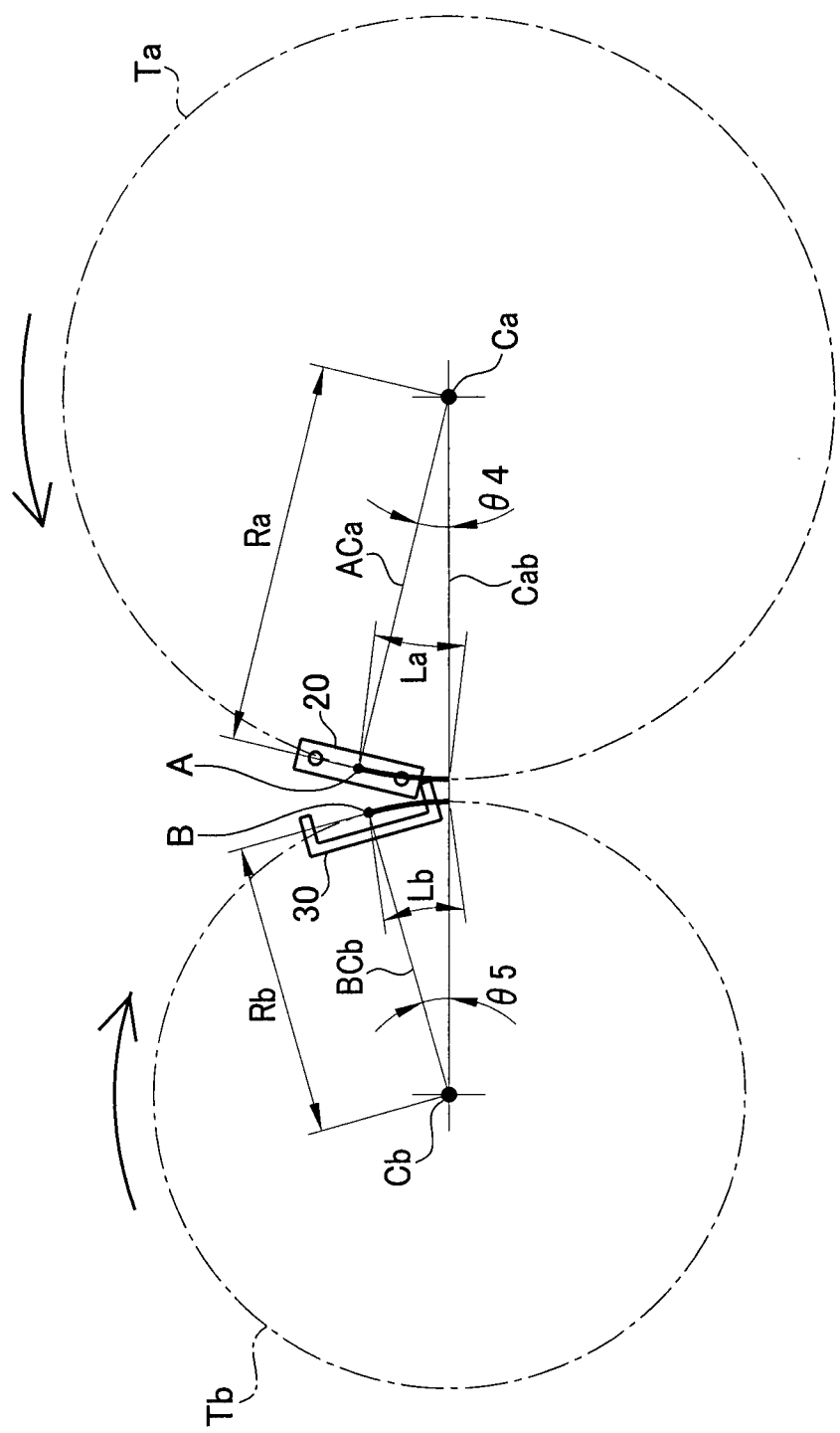
FIG. 9 is a diagram showing a case where a trajectory drawn by a cell being rotated has a larger diameter than a trajectory drawn by a frame being rotated.

In this embodiment, the trajectory Ta should preferably have a larger diameter than that of the trajectory Tb. The reason is as follows: FIG. 8 is a diagram showing a case where the trajectories Ta and Tb have the same diameter. On the other hand, FIG. 9 is a diagram showing a case where, as with this embodiment, the trajectory Ta has a larger diameter than that of the trajectory Tb. FIG. 8 and FIG. 9 both show a battery 20 and a frame 30 located slightly before the facing position. In this context, the positions slightly before the facing position refer to respective positions slightly upstream of the facing position with respect to the advancing directions of rotation of the rotary tables 120 and 130. The only difference between FIG. 8 and FIG. 9 is the diameter of the trajectory Tb.

In FIG. 8, the battery 20 is located at a position where a line ACa connecting its center point A and the point Ca and a line Cab connecting the point Ca and the point Cb make an angle of θ4. The frame 30 is located at a position where a line BCb connecting its center point B and the point Cb and the line Cab make an angle of θ5. As mentioned above, the rotary tables 120 and 130 are rotating at the same angular velocity. The battery holding jig 121 and the frame holding jig 131 are rotating with their phases matched with each other so that they face each other every time at the facing position. Therefore, θ4 and θ5 are the same angle.

In FIG. 9, similarly to FIG. 8, the battery 20 is located at a position where the line ACa and the line Cab make an angle of θ4. The frame 30 is located at a position where the line BCb and the line Cab make an angle of θ5. In FIG. 9, too, the rotary tables 120 and 130 are rotating at the same angular velocity. The battery holding jig 121 and the frame holding jig 131 are rotating with their phases matched with each other so that they face each other every time at the facing position. Therefore, θ4 and θ5 are the same angle.

In FIG. 8, the battery 20 and the frame 30 are obstructing each other at a point denoted by Y. On the other hand, in FIG. 9, there is no obstruction between the battery 20 and the frame 30, part of the battery 20 fitting into the frame 30. The fact that there is no obstruction between the battery 20 and the frame 30 in FIG. 9 results from the trajectory Ta having a larger diameter than that of the trajectory Tb.

In FIG. 8 and FIG. 9, the length of the line ACa, i.e., the radius of the trajectory Ta, is denoted by Ra. Thus, the distance La on the trajectory Ta between the facing position and the center point A of the battery 20 slightly before the facing position is expressed by the following equation (1):

$$La = 2 \cdot Ra \cdot (\theta 4/360) \quad (1)$$

The length of the line BCb, i.e., the radius of the trajectory Tb, is denoted by Rb. Thus, the distance Lb on the trajectory Tb between the facing position and the center point B of the frame 30 slightly before the facing position is expressed by the following equation (2):

$$Lb = 2 \cdot Rb \cdot (\theta 5/360) \quad (2)$$

In this context, θ4 and θ5, although being different symbols, represent the same angle in Equation (1) and Equation (2) as mentioned above.

In FIG. 8, Ra which is the radius of the trajectory Ta and Rb which is the radius of the trajectory Tb are the same. Therefore, the distance La expressed by Equation (1) equals to the distance Lb expressed by Equation (2). Thus, in FIG. 8, the battery 20 and the frame 30 are obstructing each other at the point denoted by Y. Specifically, a front portion of the battery 20 in the rotating direction thereof and a front portion of the frame 30 in the rotating direction thereof are obstructing each other.

In contrast, in FIG. 9, Ra which is the radius of the trajectory Ta is larger than Rb which is the radius of the trajectory Tb. Therefore, the distance La expressed by Equation (1) is longer than the distance Lb expressed by Equation (2). Specifically, the distance La is always longer than the distance Lb throughout the period in which the battery 20 and the frame 30 are located slightly before the facing position. Accordingly, as shown in FIG. 9, when at least part of the battery 20 is entering the frame 30, the battery 20 is displaced generally upwards relative to the frame 30 and thus does not obstruct the same.

In FIG. 9, after that, as the battery 20 and the frame 30 approach the facing position, with their insertion surface 21 and base section 31 being oriented toward parallel, the displacement mentioned above decreases. This is because the speed at which the battery 20 rotates along the trajectory Ta is faster than the speed at which the frame 30 rotates along the trajectory Tb. Thus the battery 20 is assembled to the frame 30 as it catches up therewith. Therefore, with the assembling apparatus 100, even if the frame 30 has little dimensional allowance for the battery 20 which will be accommodated therein, they can be assembled at the facing position without obstructing each other. Note that in FIG. 8, they can still be assembled since the frame 30 has some flexibility.

As described above in detail, the assembling apparatus 100 of this embodiment includes the rotary tables 120 and 130 rotating in their respective forward directions such that the battery holding jig 121 and the frame holding jig 131 face each other every time at the facing position. Batteries 20 are supplied to the battery holding jig 121 at the feeding position of batteries 20 that is different from the facing position. Frames 30 are supplied to the frame holding jig 131 at the feeding position of frames 30 that is different from the facing position. In addition, battery assemblies can be taken out sequentially by the conveyor 160. Thus the assembling apparatus 100 of this embodiment is capable of the operations of feeding, assembling, and discharging the batteries 20 and the frames 30 continuously at high speed.

In the assembling apparatus 100 of this embodiment, the diameter of the trajectory Ta drawn by the center point A of the battery 20 as the rotary table 120 rotates is larger than the diameter of the trajectory Tb drawn by the center point B of the frame 30 as the rotary table 130 rotates. This allows for accurate assembly of the battery 20 and the frame 30 without obstruction. The number of product defects due to damage to the battery 20 and the frame 30 can be reduced. In addition, the number of facility shutdown due to a battery 20 and a frame 30 dropping off of their respective holding jigs can be reduced. Thus a battery assembling apparatus and a battery assembly manufacturing method are realized, with which batteries 20 and frames 30 accommodating the batteries 20 can be accurately assembled with high productivity.

This embodiment is given for illustrative purposes only and not to be construed as limiting the present invention. Therefore it will be appreciated that the present invention can be implemented with various improvements and modifications without departing from the scope of the subject matter of the invention. For example, while this embodiment was described as being configured with two each battery holding jigs 121 and frame holding jigs 131, the invention is not limited to this. For example, it may be configured to include four each battery holding jigs 121 and frame holding jigs 131. In this construction, the battery holding jigs 121 and the frame holding jigs 131 would be arranged at every 90° on the respective rotary tables.

Also, for example, the present embodiment is described above as having the rotary tables 120 and 130 configured to rotate at the same angular velocity. However, for example, another configuration can be adopted in which the rotary tables 120 and 130 are rotated at angular velocities with a ratio of 3:2. In this configuration, the rotary table 120 has two battery holding jigs 121 spaced apart by an equal angle on the outer circumference, while the rotary table 130 has three frame holding jigs 131 spaced apart by an equal angle on the outer circumference, and the rotary tables 120 and 130 are rotated with a phase relation such that a battery holding jig 121 and a frame holding jig 131 face each other every time at the facing position. In such a configuration, additionally, obstruction can be avoided as with the embodiment described above with reference to FIG. 9 even if the diameter of the trajectory Ta is the same as the diameter of the trajectory Tb. Specifically, the obstruction between the battery 20 and the frame 30 located slightly before the facing position can be avoided. This is because the battery 20 and the frame 30 would be rotated at different speeds due to the ratio between the angular velocities of the rotary tables.

Also, for example, while this embodiment uses the cam groove 122 formed in the rotary table 120 to cause the movable guide 163 to perform the pressing action, the invention is not limited to this. A cam groove equivalent to the cam groove 122 may be formed in the rotary table 130 to cause the movable guide 163 to perform the pressing action.

Further in the present embodiment explained above, for example, the battery 20 is pressed against the frame 30. Alternatively, the frame 30 may be pressed against the battery 20.

An example of such a configuration would have the rotary table 130 formed with a cam groove equivalent to the cam groove 122 and the conveyor 160 having a guide equivalent to the movable guide 163 on the side of the rotary table 130.

Second Embodiment

A second embodiment will be described. The battery 20 and the frame 30 of this embodiment are the same as the first embodiment. This embodiment is different from the first embodiment in that the battery holding jig has an escaping mechanism.

Figure 10:
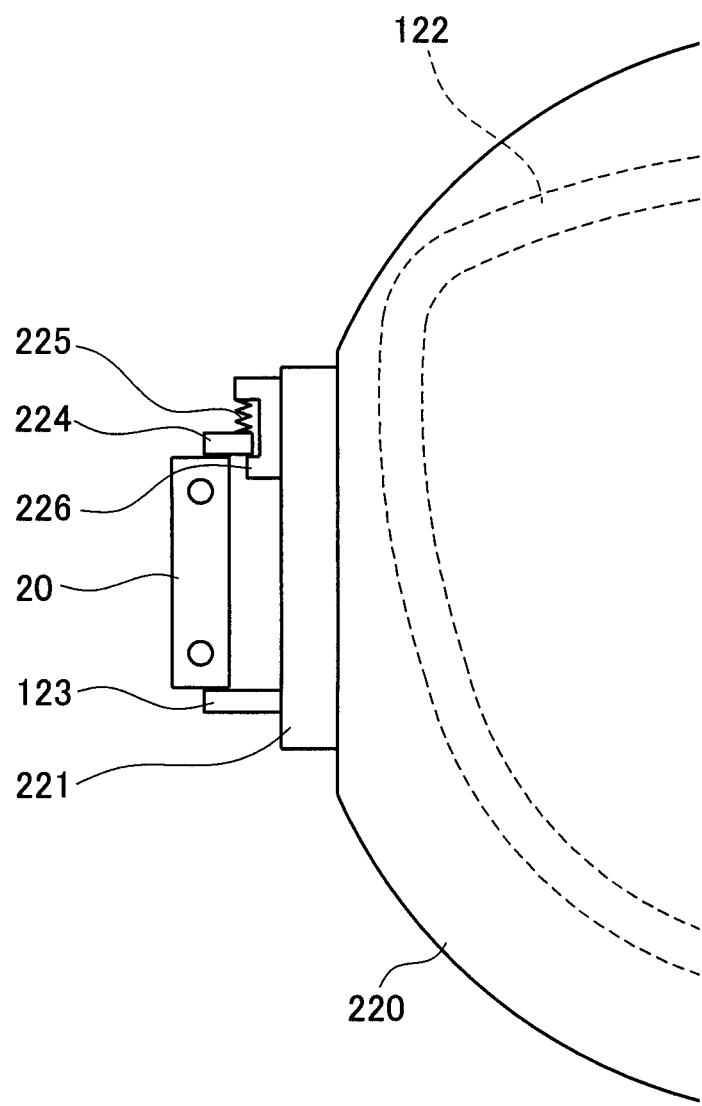
FIG. 10 is a diagram for explaining a battery holding jig of a second embodiment.

FIG. 10 is a diagram for explaining a battery holding jig 221 of an assembling apparatus 200 of this embodiment. In this embodiment, only the battery holding jig 221 is different from the first embodiment. Therefore the rotary table 130, the battery supplying magazine 140, the frame supplying magazine 150, and the conveyor 160 are configured as with those in the first embodiment.

As shown in FIG. 10, a rotary table 220 of this embodiment has the battery holding jig 221 different from that of the first embodiment. The battery holding jig 221 includes claws 123 and 224 for holding a battery 20. Further, the battery holding jig 221 includes a spring 225 for biasing the claw 224 to move closer to the claw 123, and a claw restricting portion 226 defining a limit of movement of the claw 224 by the bias of the spring 225. The spring 225 is a compression spring that can be compressed in a direction in which the claw 224 separates from the claw restricting portion 226. Therefore, when a force is applied in a direction in which the claw 224 separates from the claw restricting portion 226, the spring 225 is compressed and the claw 224 is thereby capable of a movement in accordance with the force applied. The rotary table 220 is formed with the cam groove 122 similar to that of the first embodiment.

Figure 11:
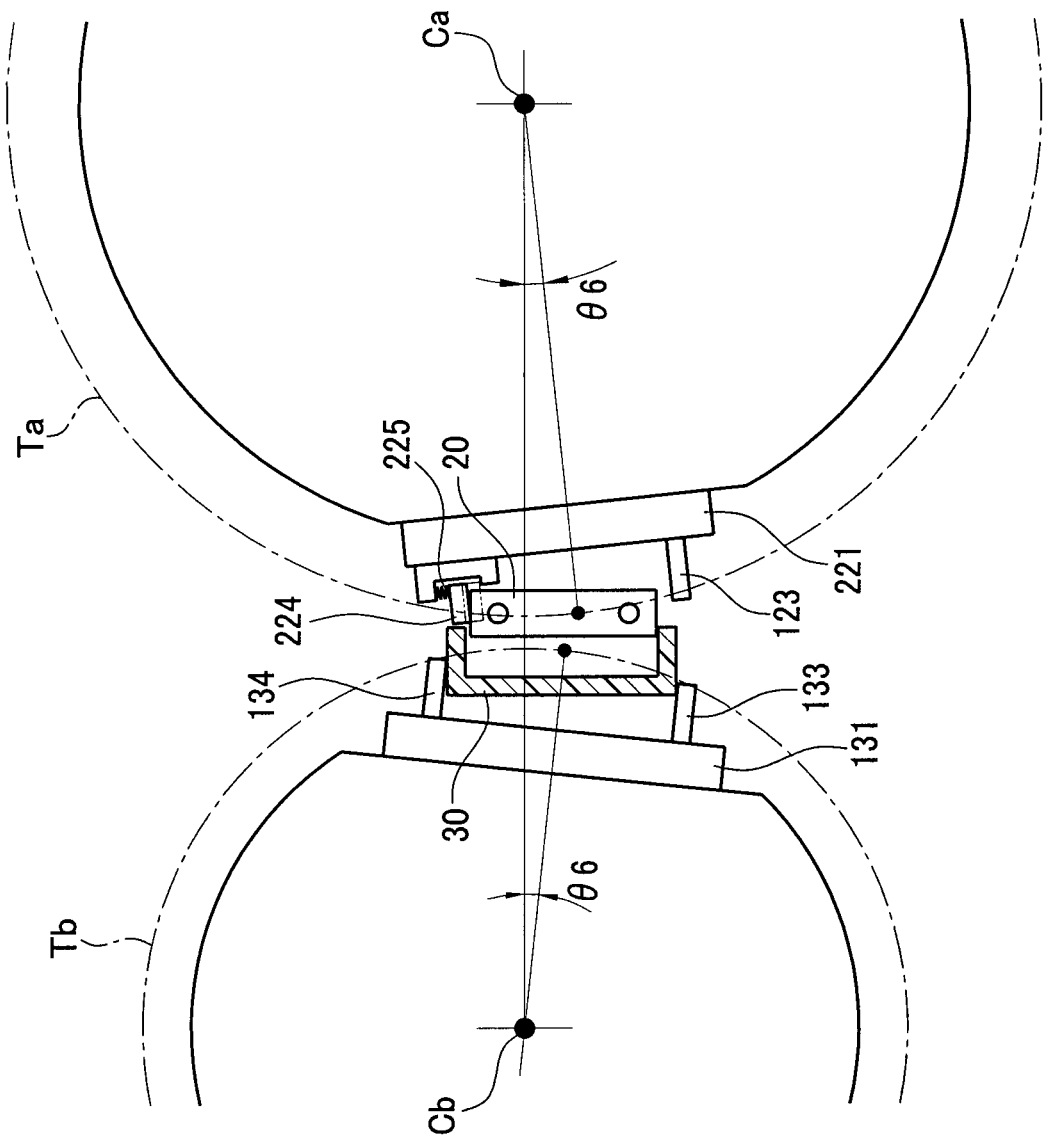
FIG. 11 is a diagram showing a battery holding jig and a frame holding jig located slightly past the facing position, with a cell and a frame at this time, in the second embodiment.

The spring 225 is provided for the claw 224 to avoid obstruction with the battery 20. FIG. 11 is a diagram showing the battery holding jig 221 and the frame holding jig 131 located slightly past the facing position, with a battery 20 and a frame 30 at this time. More particularly, the drawing shows the battery holding jig 221 and the frame holding jig 131 each located downstream of the facing position by an angle of θ6 with respect to the advancing direction of the rotation of the rotary tables 220 and 130.

In FIG. 11, the battery 20 and the frame 30 are beginning to be assembled but not fully assembled yet. The battery 20 and the frame 30 are also being transferred by the conveyor 160 downward in FIG. 11, since they have already passed the facing position. Further, the battery 20 and the frame 30 being assembled are still touching the claws of the battery holding jig 221 and the frame holding jig 131, respectively.

In FIG. 11, the claw 224 indicated by the solid line is in a state in which the spring 225 is compressed. The claw 224 indicated by the two-dot chain line is in a state before the spring 225 is compressed. The claw 224 indicated by the two-dot chain line partly overlaps the battery 20. Specifically, in a state shown in FIG. 11, if the claw 224 were fixed, the claw 224 and the battery 20 would obstruct each other. This is because the rotation speed of the battery holding jig 221 is faster than the rotation speed of the frame holding jig 131 so that the claw 224 catches up with the claw 133 by this difference in speed, which in turn makes the distance between the claws 224 and 133 smaller than the length of the battery 20 and the frame 30 in the longitudinal direction in FIG. 11.

As described above, the obstruction that may occur by a difference in rotation speed can be avoided by providing an escaping mechanism capable of accommodating the obstruction. Accordingly, with this embodiment, the number of product defects due to damage to the battery 20 and the frame 30 can be reduced even more than the first embodiment.

This embodiment is given for illustrative purposes only and not to be construed as limiting the present invention. Therefore it will be appreciated that the present invention can be implemented with various improvements and modifications without departing from the scope of the subject matter of the invention. For example, while the escaping mechanism is provided to the claw 224 in this embodiment, the invention is not limited to this. The escaping mechanism may be provided to at least one of the claw on the rear side in the rotating direction of the battery holding jig and the claw on the front side in the rotating direction of the frame holding jig. Specifically, the escaping mechanism may be provided to the claw 133 instead of the claw 224. That is, the frame holding jig 231 may have the configuration shown in FIG. 12.

Figure 12:
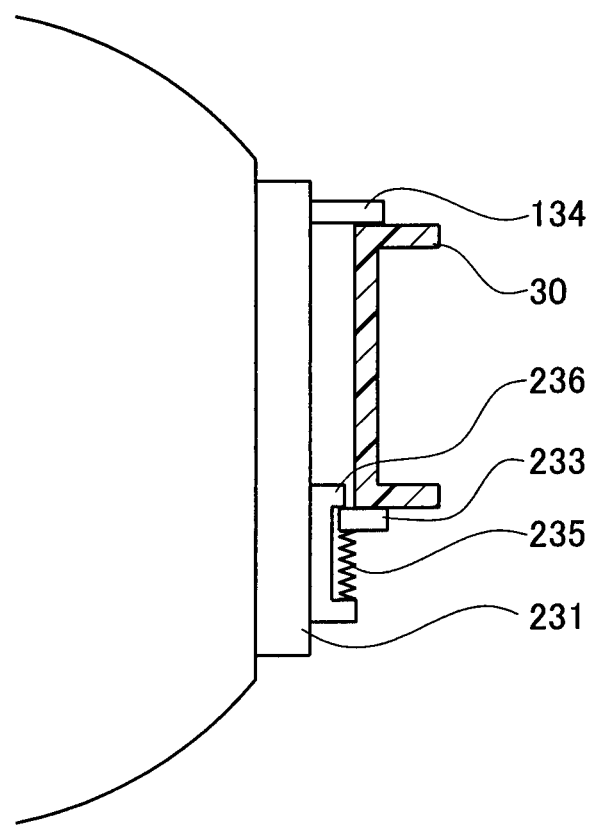
FIG. 12 is a diagram for explaining another configuration of the second embodiment.

The frame holding jig 231 shown in FIG. 12 includes claws 233 and 134 for holding a frame 30. Further, the frame holding jig 231 includes a spring 235 for biasing the claw 233 to move closer to the claw 134, and a claw restricting portion 236 defining a limit of movement of the claw 233 by the bias of the spring 235. The spring 235 is a compression spring that can be compressed in a direction in which the claw 233 separates from the claw restricting portion 236. Therefore, when a force is applied in a direction in which the claw 233 separates from the claw restricting portion 236, the spring 235 is compressed and the claw 233 is thereby capable of a movement in accordance with the force applied. With this configuration, the same effect as the configuration shown in FIG. 10 would be achieved.

Also, both of the claw on the rear side in the rotating direction of the battery holding jig and the claw on the front side in the rotating direction of the frame holding jig may have the escape mechanism. Note that a configuration without such an escaping mechanism does not necessarily cause damage to the battery 20 and the frame 30, since the frame 30 has some flexibility.

Third Embodiment

The third embodiment will be described. The battery 20 and the frame 30 of this embodiment are the same as the first embodiment. This embodiment is different from the first embodiment in that the frame holding jig holds the frame 30 in an inclined orientation such that the lower end thereof protrudes outside of the rotation radius more than the upper end.

Figure 13:
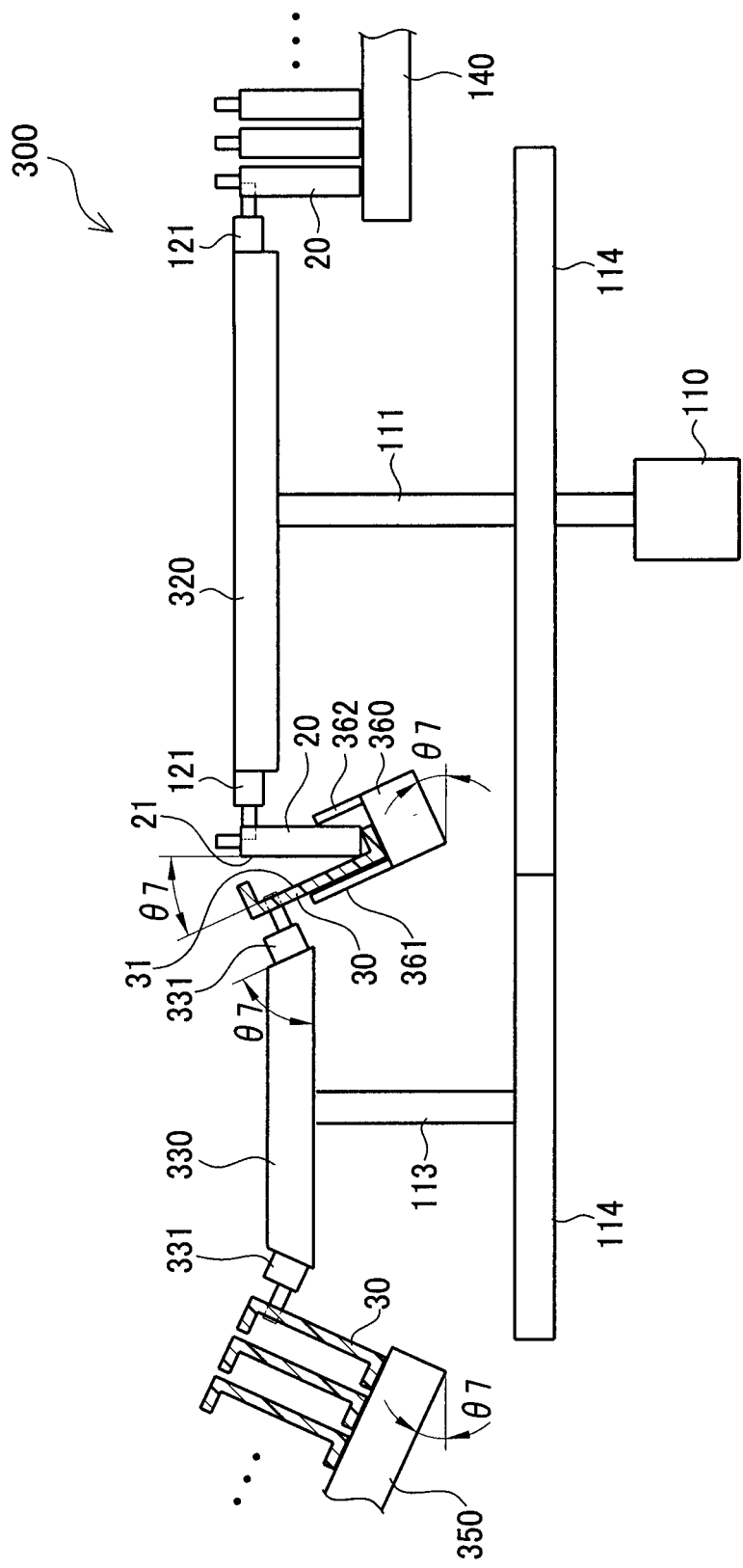
FIG. 13 is a cross section of an assembling apparatus of a third embodiment in a facing position.

FIG. 13 is a cross-sectional view at the facing position of an assembling apparatus 300 of this embodiment. FIG. 13 corresponds to FIG. 5 of the first embodiment. The assembling apparatus 300 includes a rotary table 320, a rotary table 330, the battery supplying magazine 140, a frame supplying magazine 350, and a conveyor 360. The battery supplying magazine 140 is configured as with that in the first embodiment.

The rotary table 320 includes the same battery holding jigs 121 as those of the first embodiment. Unlike the first embodiment, however, the rotary table 320 is not formed with a groove equivalent to the cam groove 122.

As shown in FIG. 13, a frame holding jig 331 holds the frame 30 in an inclined orientation such that the lower end thereof protrudes radially outward from the rotary table 330 more than the upper end. The inclination angle is set such that the angle made by the insertion surface 21 of the battery 20 and the base section 31 of the frame 30 is θ7. The configuration in association with the frame 30, namely, the rotary table 330 and the frame supply magazine 350 are inclined at the angle θ7 corresponding to the frame 30.

The conveyor 360 is also inclined by the angle θ7 corresponding to the frame 30. The conveyor 360 also has fixed guides 361 and 362. The conveyor 360, however, does not include a guide equivalent to the movable guide 163, unlike the first embodiment. Accordingly, the fixed guide 362 is made longer than the fixed guide 162 by the length of the movable guide 163.

In this embodiment, too, the battery 20 and the frame 30 are moved by the assembling apparatus 300 in a similar manner from their feeding positions to the facing position. Specifically, the battery holding jig 121 holds a battery 20 at the feeding position of the batteries 20. The rotary table 320 rotates in this state. The frame holding jig 331 holds a frame 30 at the feeding position of the frames 30 inclined at the angle θ7. The rotary table 330 rotates in this state.

The frame 30 at the facing position is therefore inclined at the angle θ7 relative to the battery 20 such that its open surface is oriented diagonally upwards. The battery 20 and the frame 30 have such a relation at the facing position that the battery 20 held by the battery holding jig 121 can enter the frame 30 by its weight. To be concrete, if FIG. 13 were viewed from above, the center point A which is the center of gravity of the battery 20 at the facing position would be located inside the frame 30 (see FIG. 14). At the facing position, the battery 20 and the frame 30 are released from their respective holding jigs. Thus the battery 20 conforms to and fits into the frame 30 by its own weight. The weight of the battery 20 further causes engagement between the locking portions 34 and the to-be-locked portions 24 so that the cell is assembled. After being assembled the battery 20 and the frame 30 are transferred by the conveyor 360 while being inclined at the angle θ7.

In this embodiment, thus, the battery 20 and the frame 30 can be assembled using the weight of the battery 20. This obviates the need to provide the configuration for pressing the battery 20 toward the frame 30, i.e., the movable guide and the cam groove for moving the guide. Further, there is no worry that the battery 20 and the frame 30 come apart after being assembled. This is because the weight of the battery 20 is always applied toward inside of the frame 30.

Note that in the first embodiment, when the battery 20 enters the frame 30, the insertion surface 21 of the battery 20 goes into the frame 30 first. This is because the insertion surface 21 of the battery 20 and the base section 31 of the frame 30 are always parallel to each other. However, the frame 30 does not have much allowance in size for the battery 20 which will be accommodated therein. Therefore, the battery 20 and the frame 30 need to be positioned relative to each other with substantially high accuracy.

In contrast, in this embodiment, when the battery 20 enters the frame 30, only the corner portion formed by the insertion surface 21 and the bottom surface of the battery 20 enters into the frame 30 first. Specifically, when entering the frame 30, the portion of the battery 20 that first enters the frame 30 is almost a line. This is because the base section 31 of the frame 30 is inclined at the angle θ7 relative to the insertion surface 21 of the battery 20. This enables favorable assembling even if there is some misalignment in parallelism between the rotation axes of the rotary tables 320 and 330, or in the position in a direction in which the gravity acts when the battery 20 enters the frame 30. Therefore, these components do not require strict positioning. Accordingly the assembling apparatus 300 of this embodiment is less expensive than the first embodiment.

This embodiment is given for illustrative purposes only and not to be construed as limiting the present invention.

Therefore it will be appreciated that the present invention can be implemented with various improvements and modifications without departing from the scope of the subject matter of the invention. For example, while the frame 30 only is inclined in this embodiment, the invention is not limited to this. The battery 20 may also be inclined, as long as the battery 20 can enter into the frame 30 by its own weight.

Further, for example, in this embodiment, the locking portions 34 and the to-be-locked portions 24 are engaged with each other by the weight of the battery 20. If, however, the weight of the battery 20 cannot provide a sufficient force to cause the engagement between the locking portions 34 and the to-be-locked portions 24, a movable guide may be provided as with the first embodiment.

Fourth Embodiment

The fourth embodiment will be described. The battery 20 and the frame 30 of this embodiment are the same as those of the first embodiment. This embodiment is different from the first embodiment in that the trajectories Ta and Tb are contacting each other at the facing position. Specifically, in this embodiment, the assembling of the battery 20 and the frame 30 is completed at the facing position.

Figure 15:
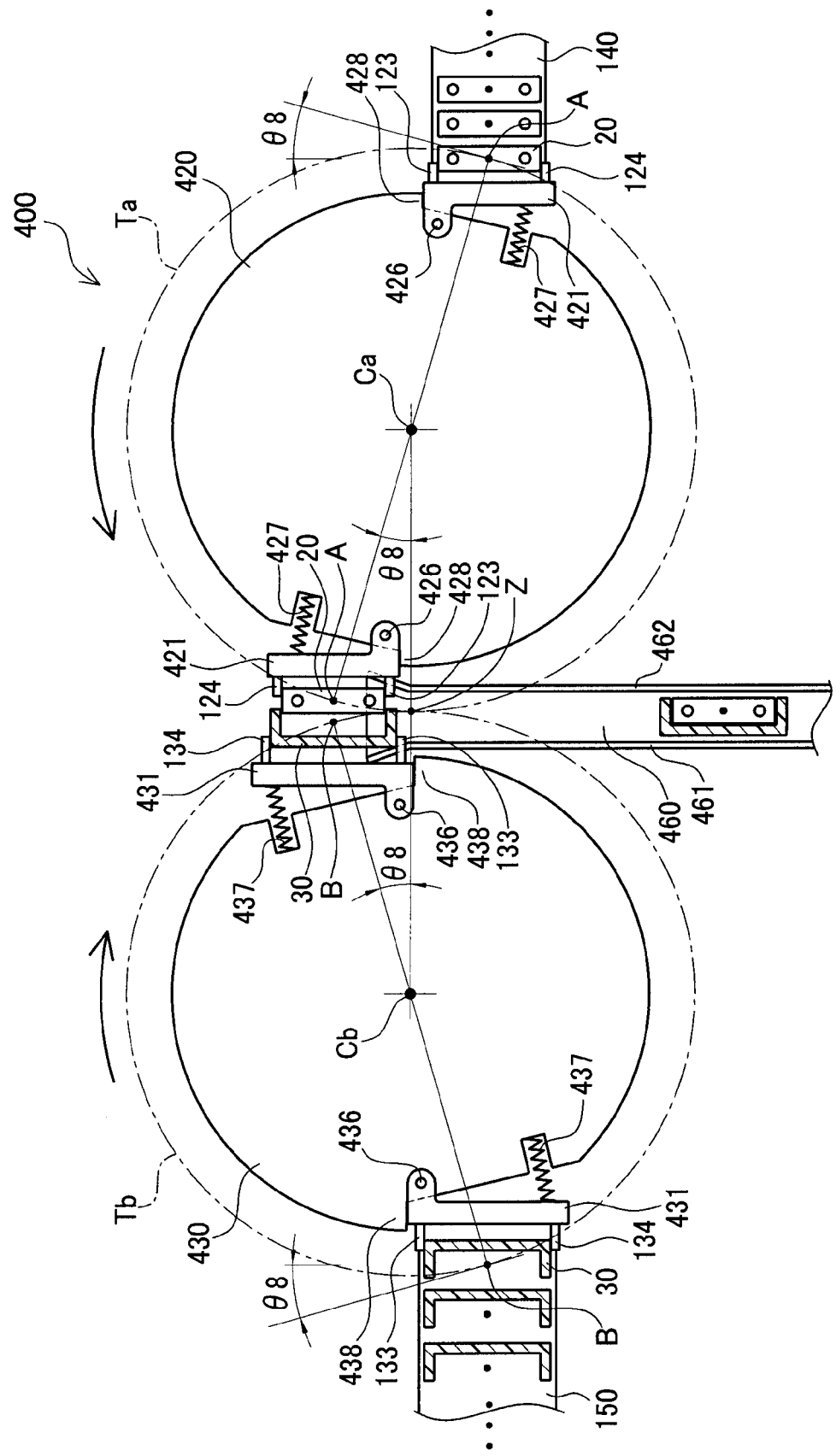
FIG. 15 is a plan view of an assembling apparatus of a fourth embodiment.

FIG. 15 is a plan view of an assembling apparatus 400 of this embodiment. The assembling apparatus 400 includes a rotary table 420, a rotary table 430, the battery supplying magazine 140, the frame supplying magazine 150, and a conveyor 460.

The rotary table 420 includes battery holding jigs 421 different from those of the first embodiment. The battery holding jig 421 includes a pivot point 426, a spring 427, and a restricting portion 428. The pivot point 426 is provided on the front side of the battery holding jig 421 in the advancing direction of rotation of the rotary table 420. The spring 427 is a compression spring biasing the rear side of the battery holding jig 421 in the advancing direction of rotation of the rotary table 420. The spring 427 biases the battery holding jig 421 radially outward from the rotary table 420. The restricting portion 428 is provided for defining a limit of movement of the battery holding jig 421 by the bias of the spring 427. Thus, the battery holding jig 421 in a normal state is positioned such that it abuts the restricting portion 428 while being biased by the spring 427. The battery holding jig 421 in a normal state is inclined at an angle θ8 relative to the first embodiment. The direction of inclination is oriented such that the rear-side end in the rotating direction of the battery holding jig 421 protrudes radially outward from the trajectory Ta more than the front-side end.

While the battery holding jig 121 of the first embodiment holds a battery 20 such that the insertion surface 21 is parallel to a tangent line of the trajectory Ta at the center point A, the battery holding jig 421 in a normal state of this embodiment holds a battery 20 in an orientation such that the insertion surface 21 is inclined at an angle θ8 relative to a tangent line of the trajectory Ta at the center point A. The direction of inclination is oriented such that the rear-side end in the rotating direction of the battery 20 protrudes radially outward from the trajectory Ta more than the front-side end. When a force is applied in a direction in which the spring 427 is compressed, the battery holding jig 421 can swing around the pivot point 426 as the fulcrum by compressing the spring 427. The rotary table 420 is not formed with a groove equivalent to the cam groove 122, unlike the first embodiment.

The rotary table 430 includes frame holding jigs 431 different from those of the first embodiment. Each of the frame holding jigs 431 includes a pivot point 436, a spring 437, and a restricting portion 438. The pivot point 436 is provided on the front side of the frame holding jig 431 in the advancing direction of rotation of the rotary table 430. The spring 437 is a compression spring biasing the rear side of the frame holding jig 431 in the advancing direction of rotation of the rotary table 430. The spring 437 biases the frame holding jig 431 radially outward from the rotary table 430. The restricting portion 438 is provided for defining a limit of movement of the frame holding jig 431 by the bias of the spring 437. Thus, the frame holding jig 431 in a normal state is positioned such that it abuts the restricting portion 438 while being biased by the spring 437. The frame holding jig 431 in a normal state is inclined at an angle θ8 relative to the first embodiment. The direction of inclination is oriented such that the rear-side end in the rotating direction of the frame holding jig 431 protrudes radially outward from the trajectory Tb more than the front-side end.

While the frame holding jig 131 of the first embodiment holds the frame 30 such that the base section 31 is parallel to a tangent line of the trajectory Tb at the center point B, the frame holding jig 431 in a normal state of this embodiment holds the frame 30 in an orientation such that the base section 31 is inclined at an angle θ8 relative to a tangent line of the trajectory Tb at the center point B. The direction of inclination is oriented such that the rear-side end in the rotating direction of the base section 31 protrudes radially outward from the trajectory Tb more than the front-side end. When a force is applied in a direction in which the spring 437 is compressed, the frame holding jig 431 can swing around the pivot point 436 as the fulcrum by compressing the spring 437.

The battery supplying magazine 140 is configured similarly to the first embodiment. However, when supplying a battery 20 to the rotary table 420, the magazine 140 feeds the battery 20 in an orientation such that the insertion surface 21 is inclined at an angle θ8 relative to a tangent line of the trajectory Ta at the feeding position of batteries 20. The direction of inclination is oriented such that the rear-side end in the rotating direction of the battery 20 protrudes radially outward from the trajectory Ta more than the front-side end.

The frame supplying magazine 150 is configured as in the first embodiment. However, when supplying a frame 30 to the rotary table 430, the magazine 150 feeds the frame 30 in an orientation such that the base section 31 is inclined at an angle θ8 relative to a tangent line of the trajectory Tb at the feeding position of frames 30. The direction of inclination is oriented such that the rear-side end in the rotating direction of the frame 30 protrudes radially outward from the trajectory Tb more than the front-side end.

The conveyor 460 includes fixedly provided fixed guides 461 and 462. The conveyor 460, however, does not include a guide equivalent to the movable guide 163, unlike the first embodiment. Accordingly, the fixed guide 462 is made longer than the fixed guide 162 by the length of the movable guide 163.

In this embodiment, the diameter of the trajectory Ta is the same as that of the trajectory Tb. In this embodiment, too, the numbers of the battery holding jigs 421 and the frame holding jigs 431 are the same. Therefore, the rotary tables 420 and 430 rotate at the same angular velocity. Thus the circumferential speed of the rotary table 420 is the same as that of the rotary table 430. The speed at which the battery holding jig 421 and the battery 20 located on the outer circumference of the rotary table 420 rotate is the same as the speed at which the frame holding jig 431 and the frame 30 located on the outer circumference of the rotary table 430 rotate.

In this embodiment, the trajectories Ta and Tb are contacting each other at the facing position Z between the rotary tables 420 and 430. That is, the center point A of the battery 20 coincides with the center point B of the frame 30 at the facing position Z. Specifically, in this embodiment, the assembling of the battery 20 and the frame 30 is completed at the facing position Z.

The battery holding jig 421 holds the battery 20 inclined at an angle θ8 such that the rear-side end in its rotating direction protrudes radially outward from the trajectory Ta more than the front-side end. The rotary table 420 rotates in this state. The frame holding jig 431 holds the frame 30 inclined at an angle θ8 such that the rear-side end in its rotating direction protrudes radially outward from the trajectory Tb more than the front-side end. The rotary table 430 rotates in this state. Thus, as shown in FIG. 15, the battery 20 and the frame 30 come to directly face each other at a position upstream of the facing position Z by the angle θ8 with respect to the advancing direction of rotation of the rotary tables 420 and 430.

Figure 16:
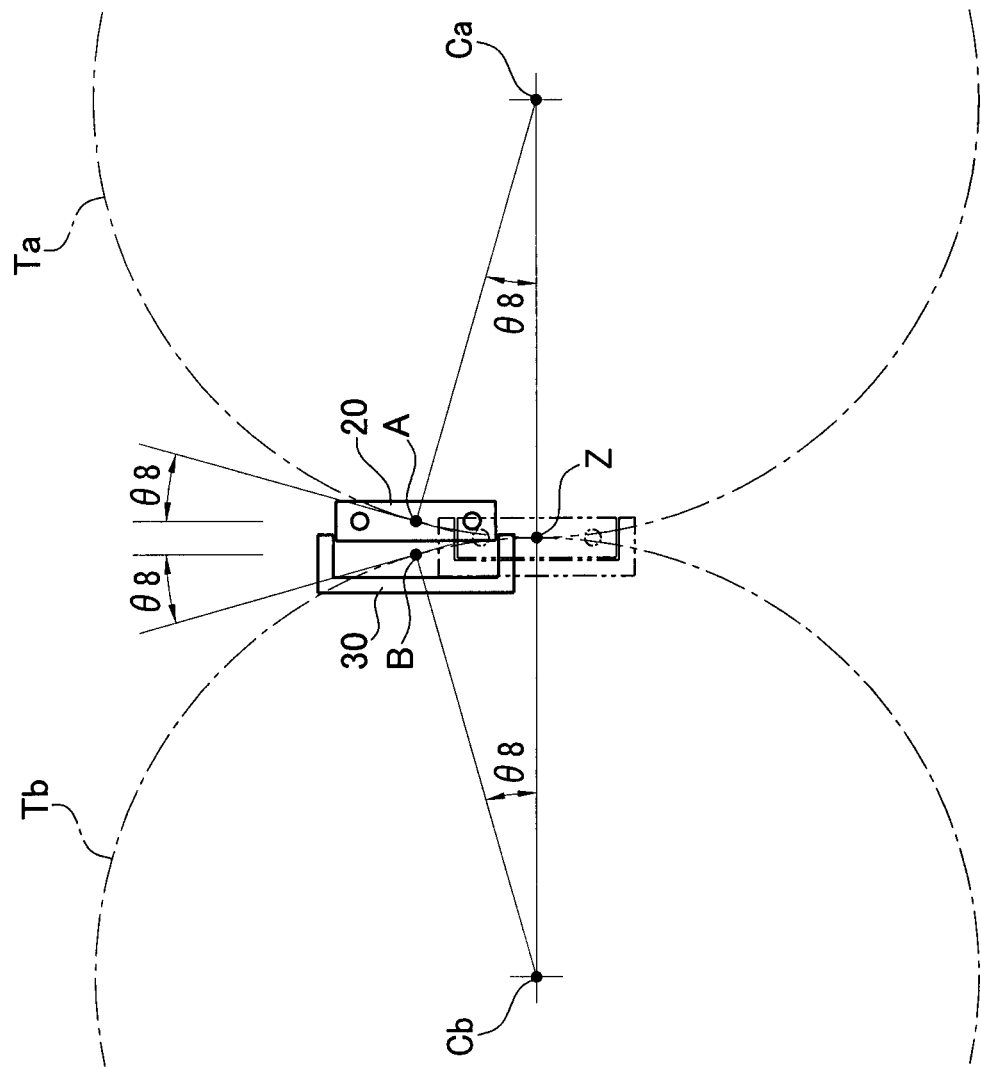
FIG. 16 is a diagram for explaining a cell and a frame of the fourth embodiment from a direct facing position to a facing position.

FIG. 16 is a diagram for explaining the movement of the battery 20 and the frame 30 from their non-slant facing position where they face parallel each other to the facing position Z. As shown in FIG. 16, the battery 20 and the frame 30 are located regularly opposite to each other at the non-slant facing position. However, the assembling of the battery 20 and the frame 30 has not been complete yet at this time point. The assembling of the battery 20 and the frame 30 is completed at the facing position Z. Specifically, the battery 20 and the frame 30 need to be facing parallel each other at the facing position Z, too. Therefore, the insertion surface 21 and the base section 31 need to be maintained in parallel to each other from the non-slant facing position to the facing position Z.

Accordingly, the battery holding jig 421 swings around the pivot point 426 as the fulcrum by compressing the spring 427 from the non-slant facing position to the facing position Z. At the same time, the frame holding jig 431 swings around the pivot point 436 as the fulcrum by compressing the spring 437 from the non-slant facing position to the facing position Z. Thus the battery holding jig 421 and the frame holding jig 431 rotate the battery 20 and the frame 30 such that the insertion surface 21 and the base section 31 are maintained in parallel to each other. In other words, the battery 20 and the frame 30 relatively approach each other while maintaining parallelism between their insertion surface 21 and base section 31. Thus the assembling of the battery 20 and the frame 30 is completed at the facing position Z.

The battery 20 and the frame 30 are released from their respective holding jigs at the facing position Z, and transferred downward in FIG. 15 by the conveyor 460. After that, the battery holding jig 421 and the frame holding jig 431, having passed the facing position Z, return to their normal state by the bias of their respective springs 427 and 437.

As explained in detail above, even the assembling apparatus of this embodiment can accurately assemble the battery 20 and the frame 30 for accommodating the battery 20. Further, this embodiment can realize a battery assembling apparatus and a battery assembly manufacturing method with high productivity.

The above embodiments are mere examples that do not give any limitations to the present invention. Therefore, the invention may be embodied variously in other specific forms without departing from the essential characteristics thereof. For instance, although the present embodiment shows the configuration that the diameter of the trajectory Ta and the diameter of the trajectory Tb are equal, the present invention is not limited thereto. As with the other embodiments, it may be arranged such that the diameter of the trajectory Ta is larger than the diameter of the trajectory Tb.

DESCRIPTION OF THE REFERENCE SIGNS

20 Battery
30 Frame
100 Assembling apparatus
120 Rotary table
121 Battery holding jig
130 Rotary table
131 Frame holding jig
140 Battery supplying magazine
150 Frame supplying magazine
160 Conveyor

The invention claimed is:

1. A method of manufacturing battery assemblies by assembling batteries and frames for accommodating the batteries, the method involving use of a first rotary table and a second rotary table and a second rotary table arranged to face each other at points on respective outer circumferences, the method comprising:
   rotating the first rotary table and the second rotary table in forward directions relative to each other and aligned to face each other at a point in a same planar direction such that the points on respective outer circumferences face each other and rotate in forward directions relative to each other,
   holding a battery with a battery holding part provided on the outer circumference of the first rotary table at a position different from a facing position between the first and second rotary tables,
   holding a frame with a frame holding part provided on the outer circumference of the second rotary table at a position different from the facing position,
   rotating the first and second rotary tables with a rotation speed ratio and in a phase relationship such that the battery holding part and the frame holding part face each other every time at the facing position; and
   taking out an assembly of the battery and the frame assembled together from the facing position.

2. A method of manufacturing battery assemblies by assembling batteries and frames for accommodating the batteries, according to claim 1,
   wherein a circumferential speed of the first rotary table is faster than that of the second rotary table.

3. A method of manufacturing battery assemblies by assembling batteries and frames for accommodating the batteries, according to claim 1,
   wherein the method includes using a movable part for pressing at least one of the battery held by the battery holding part and the frame held by the frame holding part toward the other within a facing region that contains the facing position, and
   wherein at least one of the first rotary table and the second rotary table is formed with a pressing action profile for causing the movable part to be in a non-pressing state when the battery holding part and the frame holding part are outside the facing region and for causing the movable part to perform the pressing action when the battery holding part and the frame holding part are within the facing region.

4. A method of manufacturing battery assemblies by assembling batteries and frames for accommodating the batteries, according to claim 1,
   wherein the first and second rotary tables are installed horizontally, and
   the frame holding part is configured to hold the frame in an inclined orientation such that a lower end of the frame protrudes radially outward from the second rotary table more than an upper end.

* * * * *